United States Patent
Madan et al.

(10) Patent No.: US 8,811,404 B2
(45) Date of Patent: Aug. 19, 2014

(54) SYSTEMS, APPARATUS AND METHODS FOR CONFIGURATION OF SCHEDULING POLICY TO FACILITATE DISTRIBUTED SCHEDULING

(75) Inventors: Ritesh K. Madan, Jersey City, NJ (US); Ashwin Sampath, Skillman, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 527 days.

(21) Appl. No.: 12/698,813

(22) Filed: Feb. 2, 2010

(65) Prior Publication Data

US 2010/0329198 A1  Dec. 30, 2010

Related U.S. Application Data

(60) Provisional application No. 61/220,821, filed on Jun. 26, 2009.

(51) Int. Cl.
*H04L 12/56* (2006.01)

(52) U.S. Cl.
USPC .................................................. 370/395.21

(58) Field of Classification Search
CPC ...................... H04W 28/0268; H04W 72/1242
USPC .............................. 370/241, 252–253, 395.21
See application file for complete search history.

(56) References Cited

U.S. PATENT DOCUMENTS

| | | | |
|---|---|---|---|
| 2004/0028018 A1* | 2/2004 | Cain | 370/338 |
| 2004/0253940 A1* | 12/2004 | Andrews et al. | 455/405 |
| 2006/0178112 A1 | 8/2006 | Wigard et al. | |
| 2006/0293043 A1* | 12/2006 | Aoyama | 455/422.1 |
| 2009/0097444 A1* | 4/2009 | Lohr et al. | 370/329 |
| 2009/0135778 A1* | 5/2009 | Lee et al. | 370/329 |
| 2011/0222406 A1* | 9/2011 | Persson et al. | 370/236 |

FOREIGN PATENT DOCUMENTS

| | | |
|---|---|---|
| WO | WO2006077141 A1 | 7/2006 |
| WO | 2007136530 | 11/2007 |

OTHER PUBLICATIONS

International Search Report and Written Opinion—PCT/US2010/024164, International Search Authority—European Patent Office—May 26, 2010.
Ipwireless: "EU-TDD: Intercell Interference Control by Scheduling and Text Proposal for TR 25.826" 36PP Draft; RI-050868, 3rd Generation Partnership Project (3GPP), Mobile Competence Centre ; 650, Route Des Lucioles ; F-06921 Sophia-Antipolis Cedex ; France, vol. Ran WG1, no. London, UK; 20050825, Aug. 25, 2005, XP050100493 [retrieved on Aug. 25, 2005] the whole documen.
Taiwan Search Report—TW099104895—TIPO—Apr. 17, 2013.

\* cited by examiner

*Primary Examiner* — Dang Ton
*Assistant Examiner* — Kevin Lee
(74) *Attorney, Agent, or Firm* — François A. Pelaez

(57) ABSTRACT

Systems, apparatus, methods and computer program products are provided. In some embodiments, a method for configuration of scheduling policy to facilitate distributed scheduling is provided. The method can include receiving configuration information for configuring the scheduling policy for traffic. The scheduling policy can be configured according to a provisioned priority function. The configuration information can be received at a plurality of base stations in a respective plurality of different cells for provisioning a priority function at the plurality of base stations.

76 Claims, 10 Drawing Sheets

SYSTEMS, APPARATUS AND METHODS FOR CONFIGURATION OF SCHEDULING POLICY TO FACILITATE DISTRIBUTED SCHEDULING

CROSS-REFERENCE TO RELATED APPLICATIONS

This application claims the benefit of U.S. Provisional Patent Application Ser. No. 61/220,821 titled "Method And Apparatus to Enable Configuration of Scheduling Policy for Distributed Scheduling in Femto Cells," which was filed Jun. 26, 2009, and the entire contents of which are incorporated herein by reference.

BACKGROUND

I. Field

The following description relates to wireless communications, in general, and to configuration of scheduling policy to facilitate distributed scheduling in wireless communication systems, in particular.

II. Background

Wireless communication systems are widely deployed to provide various types of communication. For instance, voice and/or data can be provided via such wireless communication systems. A typical wireless communication system, or network, can provide multiple users access to one or more shared resources (e.g., bandwidth, transmit power). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple access communication systems can simultaneously support communication for multiple user equipment (UEs). Each UE can communicate with one or more base stations (BSs) via transmissions on forward and reverse links. The forward link (or downlink (DL)) refers to the communication link from BSs to UEs, and the reverse link (or uplink (UL)) refers to the communication link from UEs to BSs.

In macro-cellular networks, the BS, in particular, and the infrastructure, in general, is typically provided by very few vendors. Moreover, BSs manufactured by different vendors are usually not deployed in neighboring cells. Accordingly, the service provided for a selected type of traffic is typically consistent across the BSs for the same designated Quality of Service (QoS).

However, in Femto environments, Femto BSs may be manufactured by multiple vendors but deployed on a single frequency for a given operator. Accordingly, interference management is desirable. Further, while the service provided for a selected type of traffic should be the same across vendors, different vendors may provide different service according to the manner in which the schedulers at the different BSs are configured. To improve the likelihood of consistency in service across different BSs, synchronizing the prioritization mechanisms across the different BSs can be employed. Accordingly, configuration of scheduling policy across BSs for distributed scheduling is desirable.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with configuration of scheduling policy to facilitate distributed scheduling in wireless communication systems.

According to related aspects, a method is provided. In some embodiments, the method can include receiving configuration information to provision a priority function for configuring the scheduling policy for traffic. The configuration information to provision a priority function for configuring the scheduling policy for traffic can be received at a plurality of base stations in a respective plurality of different cells. The configuration information can be for provisioning the priority function for configuring the scheduling policy for traffic at each of the plurality of base stations in the respective plurality of different cells.

According to other related aspects, a computer program product is provided. The computer program product can include a computer-readable medium including a first set of codes for causing a computer to receive configuration information to provision a priority function for configuring the scheduling policy for traffic. The configuration information to provision a priority function for configuring the scheduling policy for traffic can be received at a plurality of base stations in a respective plurality of different cells. The configuration information can be for provisioning the priority function for configuring the scheduling policy for traffic at each of the plurality of base stations in the respective plurality of different cells.

According to other related aspects, an apparatus is provided. The apparatus can include means for receiving configuration information to provision a priority function for configuring the scheduling policy for traffic. The configuration information to provision a priority function for configuring the scheduling policy for traffic can be received at a plurality of base stations in a respective plurality of different cells. The configuration information can be for provisioning the priority function for configuring the scheduling policy for traffic at each of the plurality of base stations in the respective plurality of different cells.

According to yet other related aspects, another apparatus is provided. The apparatus can include a base station provisioning interface configured to receive configuration information to provision a priority function for configuring the scheduling policy for traffic. The configuration information to provision a priority function for configuring the scheduling policy for traffic can be received at a plurality of base stations in a respective plurality of different cells. The configuration information can be for provisioning the priority function for configuring the scheduling policy for traffic at each of the plurality of base stations in the respective plurality of different cells.

According to other aspects, a method for configuration of scheduling policy to facilitate distributed scheduling is provided. The method can include transmitting configuration information to provision a priority function for configuring a scheduling policy for traffic. The configuration information can be transmitted to a plurality of BSs in a respective plurality of different cells for provisioning the priority function at each of the plurality of BSs.

According to yet other aspects, another computer program product is provided. The computer program product includes a computer-readable medium. The computer-readable medium can include a first set of codes for causing a computer to transmit configuration information to provision a priority function for configuring a scheduling policy for traffic. The configuration information can be transmitted to a plurality of BSs in a respective plurality of different cells for provisioning the priority function at each of the plurality of BSs.

According to other aspects, another apparatus is provided. The apparatus can include means for transmitting configuration information to provision a priority function for configuring a scheduling policy for traffic. The configuration information can be transmitted to a plurality of BSs in a respective plurality of different cells for provisioning the priority function at each of the plurality of BSs.

According to yet other aspects, another apparatus is provided. The apparatus can include a controller provisioning interface configured to transmit configuration information to provision a priority function for configuring a scheduling policy for traffic. The configuration information can be transmitted to a plurality of BSs in a respective plurality of different cells for provisioning the priority function at each of the plurality of BSs.

Toward the accomplishment of the foregoing and related ends, the one or more embodiments comprise the features hereinafter fully described and particularly pointed out in the claims. The following description and the annexed drawings set forth herein detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
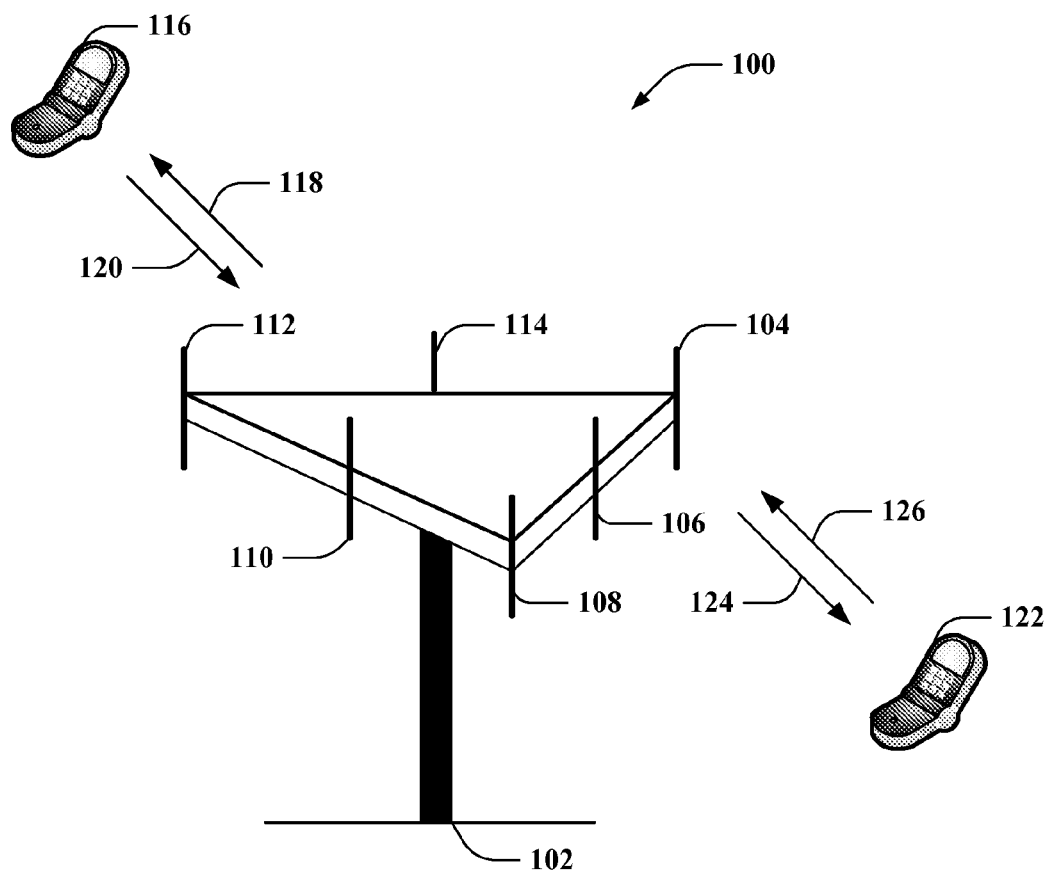
FIG. 1 is an illustration of an example wireless communication system providing configuration of scheduling policy for facilitating distributed scheduling in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiments may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software and/or software in execution. For example, a component can be, but is not limited to being, a process running on a processor, a processor, an object, an executable, a thread of execution, a program, and/or a computer. By way of illustration, both an application running on a computing device and/or the computing device can be a component. One or more components can reside within a process and/or thread of execution and a component can be localized on one computer and/or distributed between two or more computers. In addition, these components can execute from various computer-readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and/or other systems. The terms "system" and "network" are often used interchangeably. A CDMA system can implement a radio technology such as Universal Terrestrial Radio Access (UTRA), CDMA8020, etc. UTRA includes Wideband-CDMA (W-CDMA) and other variants of CDMA. CDMA8020 covers IS-8020, IS-95 and IS-856 standards. An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA8020 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA) utilizes single carrier modulation and frequency domain equalization. SC-FDMA can have similar performance and essentially the same overall complexity as those of an OFDMA system. A SC-FDMA signal can have lower peak-to-average power ratio (PAPR) because of its inherent single carrier structure. SC-FDMA can be used, for instance, in uplink communications where lower PAPR greatly benefits UEs in terms of transmit power efficiency. Accordingly, SC-FDMA can be implemented as an uplink multiple access scheme in 3GPP Long Term Evolution (LTE) or Evolved UTRA.

Furthermore, various embodiments are described herein in connection with UEs. A UE can also be called a system, subscriber unit, subscriber station, mobile station, mobile, remote station, remote terminal, mobile device, access terminal, wireless communication device, user agent or user device. A UE can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a BS or access node (AN). A BS can be utilized for communicating with UEs and can also be referred to as an access point, BS, Femto node, Pico Node, Node B, Evolved Node B (eNodeB, eNB) or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include, but are not limited to, magnetic storage devices (e.g., hard disk, floppy disk, magnetic strips), optical disks (e.g., compact disk (CD), digital versatile disk (DVD)), smart cards, and flash memory devices (e.g., EPROM, card, stick, key drive). Additionally, various storage media described herein can represent one or more devices and/or other machine-readable media for storing information. The term "machine-readable medium" can include, without being limited to, wireless channels and various other media (and/or storage media) capable of storing, containing, and/or carrying codes and/or instruction(s) and/or data.

In some aspects the teachings herein may be employed in a network that includes macro scale coverage (e.g., a large area cellular network such as a 3G networks, typically referred to as a macro cell network) and smaller scale coverage (e.g., a residence-based or building-based network environment). A UE moves through such a network. The UE may be served in certain locations by BSs that provide macro coverage while the UE may be served at other locations by BSs that provide smaller scale coverage. In some aspects, the smaller coverage nodes may be used to provide incremental capacity growth, in-building coverage, and different services (e.g., for a more robust user experience). In the discussion herein, a node that provides coverage over a relatively large area may be referred to as a Macro node. A node that provides coverage over a relatively small area (e.g., a residence) may be referred to as a Femto node. A node that provides coverage over an area that is smaller than a macro area and larger than a Femto area may be referred to as a Pico node (e.g., providing coverage within a commercial building).

A cell associated with a Macro node, a Femto node, or a Pico node may be referred to as a macro cell, a Femto cell, or a Pico cell, respectively. In some implementations, each cell may be further associated with (e.g., divided into) one or more sectors.

In various applications, other terminology may be used to reference a Macro node, a Femto node, or a Pico node. For example, a Macro node may be configured or referred to as a BS, access point, eNodeB, macro cell, and so on. Also, a Femto node may be configured or referred to as a Home NodeB, Home eNodeB, access point access node, a BS, a Femto cell, and so on.

FIG. 1 is an illustration of an example wireless communication system providing configuration of scheduling policy for facilitating distributed scheduling in accordance with various aspects set forth herein. In wireless communication system 100, interference caused by transmissions on the UL can be managed by the BS 102 while interference caused by transmissions on the DL can be managed by the UEs 116, 122.

Referring now to FIG. 1, a wireless communication system 100 is illustrated in accordance with various embodiments presented herein. System 100 includes a BS 102 that can include multiple antenna groups. For example, one antenna group can include antennas 104, 106, another group can comprise antennas 108, 110, and an additional group can include antennas 112, 114. Two antennas are illustrated for each antenna group; however, more or fewer antennas can be utilized for each group. BS 102 can additionally include a transmitting node chain and a receiving node chain, each of which can in turn comprise a plurality of components associated with signal transmission and reception (e.g., processors, modulators, multiplexers, demodulators, demultiplexers, antennas), as will be appreciated by one skilled in the art.

BS 102 can communicate with one or more UEs such as UE 116, 122. However, it is to be appreciated that BS 102 can communicate with substantially any number of UEs similar to UEs 116, 122. UEs 116, 122 can be, for example, cellular phones, smart phones, laptops, handheld communication devices, handheld computing devices, satellite radios, global positioning systems, PDAs, and/or any other suitable device for communicating over wireless communication system 100. As depicted, UE 116 is in communication with antennas 112, 114, where antennas 112, 114 transmit information to UE 116 over DL 118 and receive information from UE 116 over a UL 120. Moreover, UE 122 is in communication with antennas 104, 106, where antennas 104, 106 transmit information to UE 122 over a DL 124 and receive information from UE 122 over a UL 126. In a frequency division duplex (FDD) system, DL 118 can utilize a different frequency band than that used by UL 120, and DL 124 can employ a different frequency band than that employed by UL 126, for example. Further, in a time division duplex (TDD) system, DL 118 and UL 120 can utilize a common frequency band and DL 124 and UL 126 can utilize a common frequency band.

Each group of antennas and/or the area in which they are designated to communicate can be referred to as a sector of BS 102. For example, antenna groups can be designed to communicate to UEs in a sector of the areas covered by BS 102. In communication over DLs 118, 124, the transmitting antennas of BS 102 can utilize beamforming to improve signal-to-noise ratio of DLs 118, 124 for UEs 116, 122. Also, while BS 102 utilizes beamforming to transmit to UEs 116, 122 scattered randomly through an associated coverage, UEs 116, 122 in neighboring cells can be subject to less interference as compared to a BS transmitting through a single antenna to all its UEs. Further, the BS 102 and UEs 116, 122 can be configured providing configuration of scheduling policy for facilitating distributed scheduling as described herein.

Figure 2:
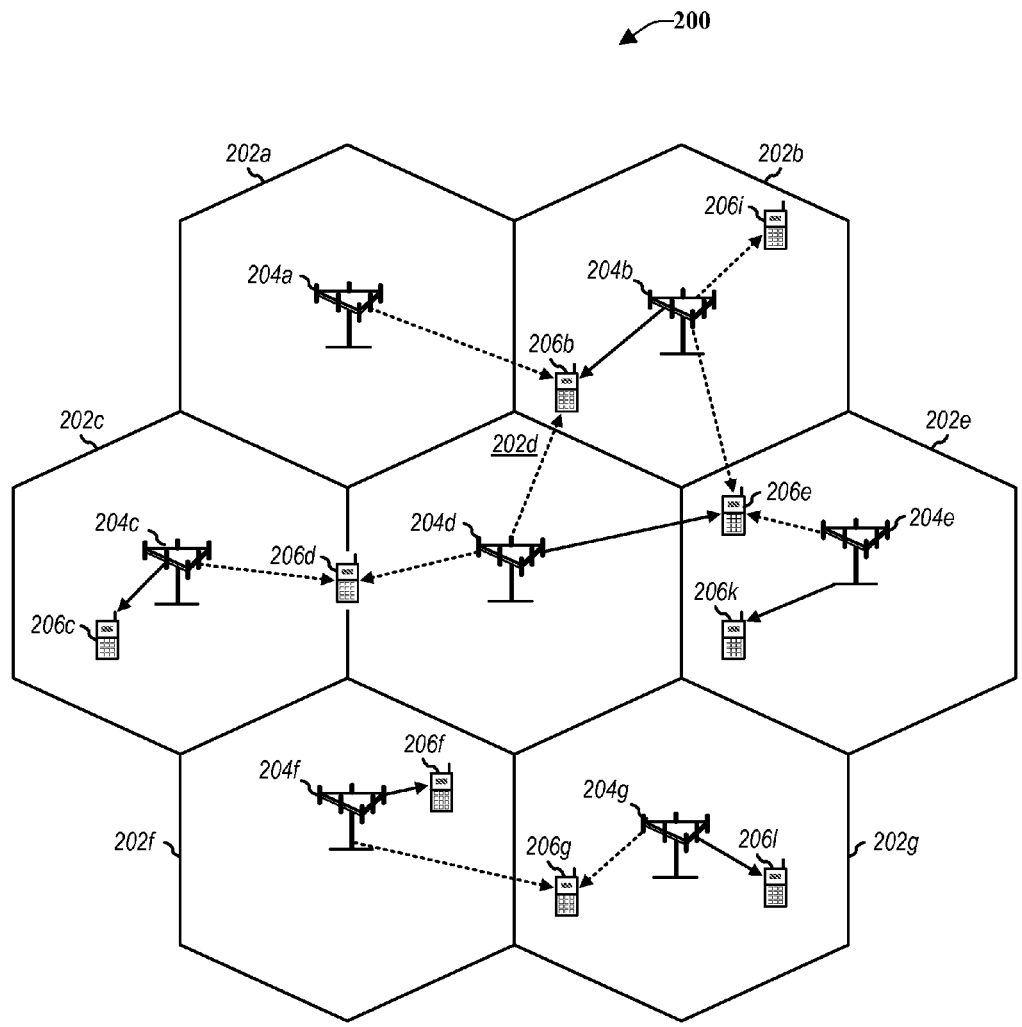
FIG. 2 is an illustration of another example wireless communication system providing configuration of scheduling policy for facilitating distributed scheduling for a number of users in accordance with various aspects set forth herein.

FIG. 2 is an illustration of another example wireless communication system providing configuration of scheduling policy for facilitating distributed scheduling for a number of users in accordance with various aspects set forth herein. The system 200 provides communication for multiple cells 202, such as, for example, macro cells 202A-202G, with each cell being serviced by a corresponding BS 204 (e.g., BS 204A-204G). As shown in FIG. 2, UE 206 (e.g., UEs 206A-206L) can be dispersed at various locations throughout the system over time. Each UE 206 can communicate with one or more BS 204 on a DL or a UL at a given moment, depending upon whether the UE 206 is active and whether it is in soft handoff, for example. The wireless communication system 200 may provide service over a large geographic region. For example, macro cells 202A-202G may cover a few blocks in a neighborhood.

Figure 3:
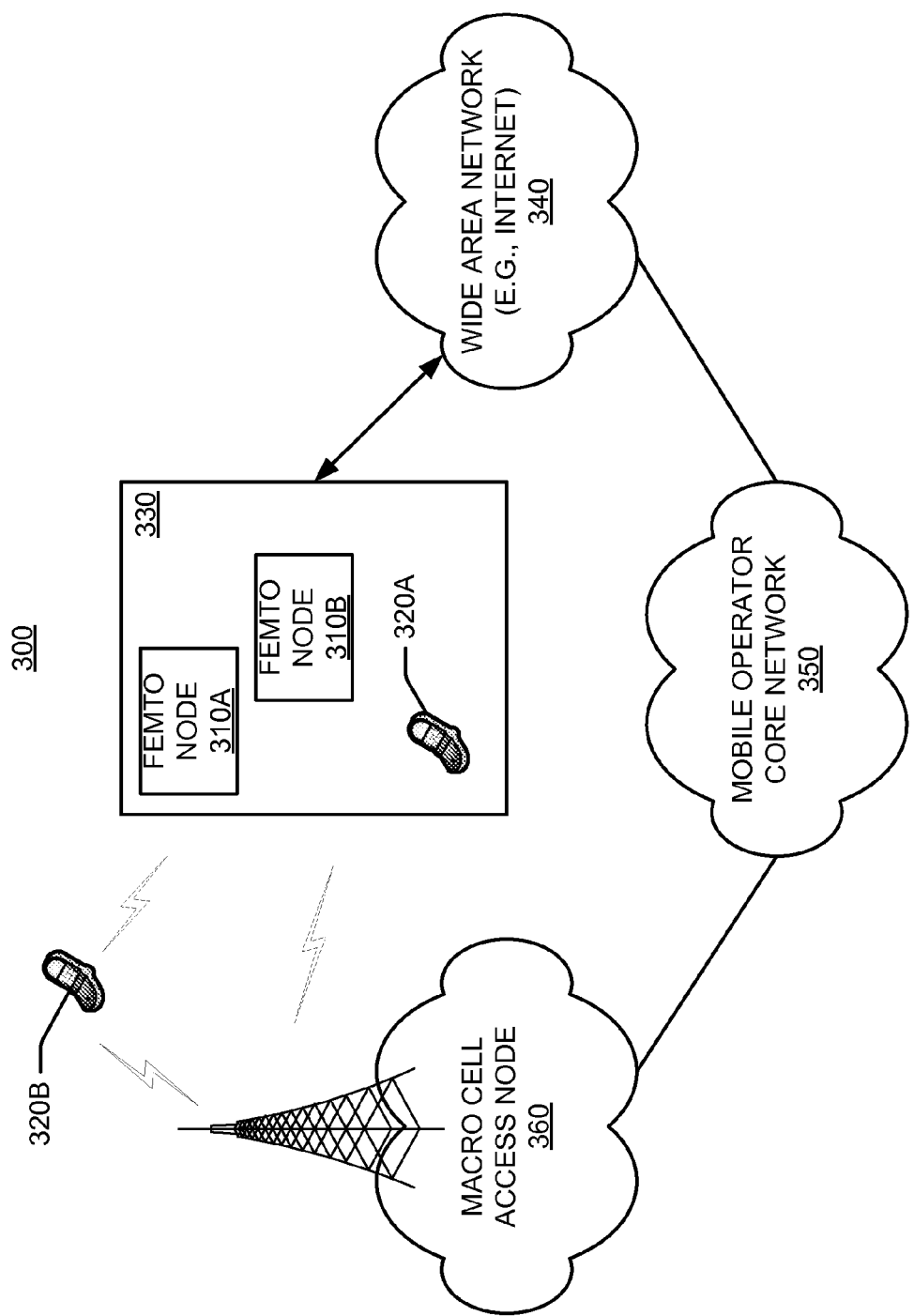
FIG. 3 is an illustration of an example wireless communication system where one or more Femto nodes are deployed providing configuration of scheduling policy for facilitating distributed scheduling in accordance with various aspects set forth herein.

FIG. 3 is an illustration of an example wireless communication system where one or more Femto nodes are deployed providing configuration of scheduling policy for facilitating distributed scheduling in accordance with various aspects set forth herein. Specifically, the system 300 includes multiple Femto nodes 310 (e.g., Femto nodes 310A and 310B) installed in a relatively small scale network environment (e.g., in one or more user residences 330). Each Femto node 310 can be coupled to a wide area network 340 (e.g., the Internet) and a mobile operator core network 350 via a DSL router, a cable modem, a wireless link, or other connectivity means (not shown). As will be discussed below, each Femto node 310 can be configured to serve associated UEs (e.g., associated UE 320A) and, optionally, alien UEs (e.g., alien UE 320B). In other words, access to Femto nodes 310 may be restricted whereby a given UE 320 can be served by a set of designated (e.g., home) Femto node(s) 310 but may not be served by any non-designated Femto nodes 310 (e.g., a neighbor's Femto node 310).

However, in various embodiments, an associated UE 320A can experience interference on the DL from a Femto node 310 serving an alien UE 320B. Similarly, a Femto node 310 associated with associated UE 320A can experience interference on the UL from the alien UE 320B. In embodiments, interference management can be facilitated in the system 300 as described herein.

Figure 4:
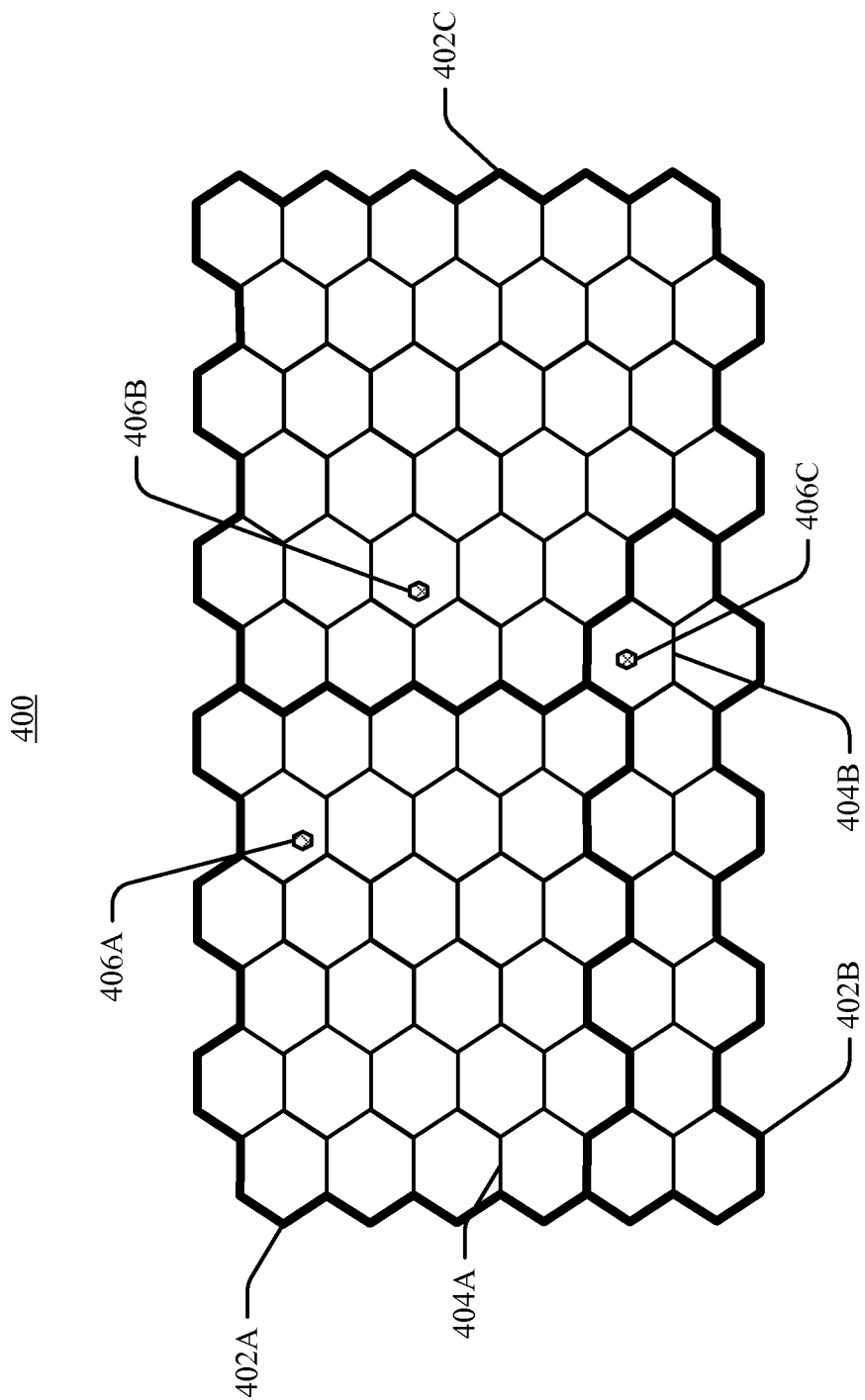
FIG. 4 is an illustration of an example coverage map in a wireless communication system providing configuration of scheduling policy for facilitating distributed scheduling in accordance with various aspects set forth herein.

FIG. 4 is an illustration of an example coverage map in a wireless communication system providing configuration of scheduling policy for facilitating distributed scheduling in accordance with various aspects set forth herein. The coverage map 400 can include several tracking areas 402 (or routing areas or location areas), each of which can include several macro coverage areas. In the embodiment shown, areas of coverage associated with tracking areas 402A, 402B, and 402C are delineated by the wide lines and the macro coverage areas 404 are represented by the hexagons. The tracking areas 402A, 402B, and 402C can include Femto coverage areas 406. In this example, each of the Femto coverage areas 406 (e.g., Femto coverage area 406C) is depicted within a macro coverage area 404 (e.g., macro coverage area 404B). It should be appreciated, however, that a Femto coverage area 406 may not lie entirely within a macro coverage area 404. In practice, a large number of Femto coverage areas 406 can be defined with a given tracking area 402 or macro coverage area 404. Also, one or more Pico coverage areas (not shown) can be defined within a given tracking area 402 or macro coverage area 404.

Referring again to FIG. 3, the owner of a Femto node 310 can subscribe to mobile service, such as, for example, 3G mobile service, offered through the mobile operator core network 350. In addition, a UE 320 may be capable of operating both in macro environments and in smaller scale (e.g., residential) network environments. In other words, depending on the current location of the UE 320, the UE 320 may be served by an access node 360 of the mobile operator core network 350 or by any one of a set of Femto nodes 310 (e.g., the Femto nodes 310A and 310B that reside within a corresponding user residence 330). For example, when a subscriber is outside his home, he is served by a standard macro access node (e.g., node 360) and when the subscriber is at home, he is served by a Femto node (e.g., node 310A). Here, it should be appreciated that a Femto node 310 may be backward compatible with existing UEs 320.

A Femto node 310 may be deployed on a single frequency or, in the alternative, on multiple frequencies. Depending on the particular configuration, the single frequency or one or more of the multiple frequencies can overlap with one or more frequencies used by a Macro node (e.g., node 360).

In some aspects, a UE 320 can be configured to connect to a preferred Femto node (e.g., the home Femto node of the UE 320) whenever such connectivity is possible. For example, whenever the UE 320 is within the user residence 330, it may be desired that the UE 320 communicate only with the home Femto node 310.

In some aspects, if the UE 320 operates within the mobile operator core network 350 but is not residing on its most preferred network (e.g., as defined in a preferred roaming list), the UE 320 may continue to search for the most preferred network (e.g., the preferred Femto node 310) using a Better System Reselection (BSR), which can involve a periodic scanning of available systems to determine whether better systems are currently available, and subsequent efforts to associate with such preferred systems. With the acquisition entry, the UE 320 may limit the search for specific band and channel. For example, the search for the most preferred system may be repeated periodically. Upon discovery of a preferred Femto node 310, the UE 320 selects the Femto node 310 for camping within its coverage area.

A Femto node may be restricted in some aspects. For example, a given Femto node may only provide certain services to certain UEs. In deployments with so-called restricted (or closed) association, a given UE may only be served by the macro cell mobile network and a defined set of Femto nodes (e.g., the Femto nodes 310 that reside within the corresponding user residence 330). In some implementations, a node may be restricted to not provide, for at least one node, at least one of: signaling, data access, registration, paging, or service.

In some aspects, a restricted Femto node (which may also be referred to as a Closed Subscriber Group Home NodeB) is one that provides service to a restricted provisioned set of UEs. This set may be temporarily or permanently extended as necessary. In some aspects, a Closed Subscriber Group (CSG) may be defined as the set of BSs (e.g., Femto nodes)

that share a common access control list of UEs. A channel on which all Femto nodes (or all restricted Femto nodes) in a region operate may be referred to as a Femto channel.

Various relationships may thus exist between a given Femto node and a given UE. For example, from the perspective of a UE, an open Femto node may refer to a Femto node with no restricted association. A restricted Femto node may refer to a Femto node that is restricted in some manner (e.g., restricted for association and/or registration). A home Femto node may refer to a Femto node on which the UE is authorized to access and operate on. A guest Femto node may refer to a Femto node on which a UE is temporarily authorized to access or operate on. An alien Femto node may refer to a Femto node on which the UE is not authorized to access or operate on, except for perhaps emergency situations (e.g., 911 calls).

From a restricted Femto node perspective, a home UE may refer to a UE that authorized to access the restricted Femto node. A guest UE may refer to a UE with temporary access to the restricted Femto node. An alien UE may refer to a UE that does not have permission to access the restricted Femto node, except for perhaps emergency situations, for example, such as 911 calls (e.g., a UE that does not have the credentials or permission to register with the restricted Femto node).

While the description of FIG. 4 has been provided with reference to a Femto node, it should be appreciated, that a Pico node may provide the same or similar functionality for a larger coverage area. For example, a Pico node may be restricted, a home Pico node may be defined for a given UE, and so on.

A wireless multiple-access communication system can simultaneously support communication for multiple wireless UEs. As mentioned above, each UE can communicate with one or more BSs via transmissions on the DL or the UL. These communication links (i.e., DL and UL) may be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system can support TDD and FDD. In a TDD system, the DL and UL transmissions can be on the same frequency region so that the reciprocity principle allows the estimation of the DL channel from the UL. This enables the BS to transmit beam-forming gain on the DL when multiple antennas are available at the BS. In some embodiments, the channel conditions of the UL channel can be estimated from the DL channel, for interference management, as described herein.

Figure 5:
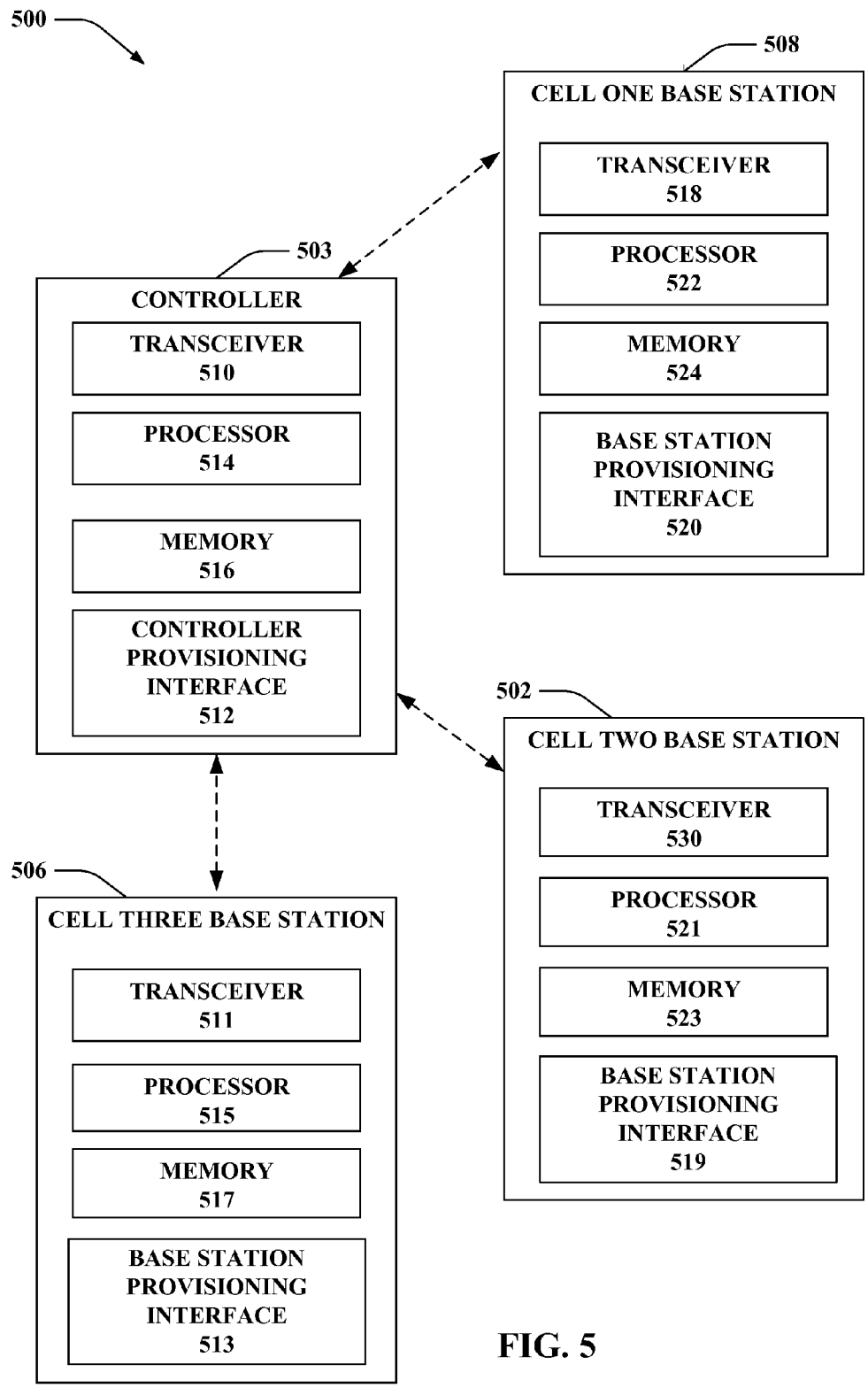
FIG. 5 is an illustration of an example block diagram of a wireless communication system providing configuration of scheduling policy for facilitating distributed scheduling in accordance with various aspects set forth herein.

FIG. 5 is an illustration of an example block diagram of a wireless communication system providing configuration of scheduling policy for facilitating distributed scheduling in accordance with various aspects set forth herein.

The system 500 can include one or more BSs 502, 506, 508 in respective cells of system 500, and at least one controller 503. In some embodiments, the BSs 502, 506, 508 can be BSs located in one or more different cells. In some embodiments, one or more of BSs 502, 506, 508 can be Femto access nodes configured to provide communication to and from a UE in the Femto cell managed by the Femto access node. the BSs 502, 506, 508 can be manufactured by one or more different vendors in various embodiments. In some embodiments when the BSs 502, 506, 508 are manufactured by different vendors, the BSs 502, 506, 508 can be configured by the manufacturer in a manner that cause the BSs 502, 506, 508 to operate to provide one or more different scheduling policies for a similar type of traffic. The configuration information provided by the controller provisioning interface 512 to the BS provisioning interfaces 519, 513, 520 can cause the BSs 502, 506, 508 to operate to provide a similar scheduling policy for a similar type of traffic upon configuration by the BS 502, 506, 508.

The controller 503 can be configured to define and/or provision the parameters in the BSs 502, 506, 508. In some embodiments, the controller 503 can be configured to determine configuration information that can be provided to the BSs 502, 506, 508 to configure scheduling policy at the BSs 502, 506, 508. The scheduling policy at the BSs 502, 506, 508 can enable the BSs 502, 506, 508 to provide similar scheduling of traffic, across BSs 502, 506, 508 for traffic having a similar associated priority metric, quality of service (QoS), Quality of Service Class Identifier (QCI) parameter and/or traffic type.

The BSs 502, 506, 508 can include BS provisioning interfaces 519, 513, 520, respectively, and the controller 503 can include a controller provisioning interface 512. In some embodiments, the controller provisioning interface 512 can be configured to generate and/or output configuration information to the BSs provisioning interfaces 519, 513, 520 for configuring the scheduling policy at the BSs 502, 506, 508.

BS provisioning interfaces 519, 513, 520 can differ in structure and/or functionality from controller provisioning interface 512. Similarly, BS provisioning interfaces 519, 513, 520 can differ according to the functionality with which the associated BS is configured. For example, if BS 506 and BS 502 are manufactured by different vendors, BS provisioning interface 513 and BS provisioning interface 519 can differ in functionality and structure. By way of example, but not limitation, BS provisioning interface 513 and BS provisioning interface 519 can be configured by the manufacturer with two different priority functions and therefore map similar traffic parameters (e.g., average rate, queue length and/or head of line (HOL) delay) to two different priority metrics. Accordingly, the BSs 506, 502 may schedule similar traffic differently as the BSs 506, 502 may schedule the traffic according to the priority metric for the traffic.

For example, the priority function that maps the average rate, queue length and/or HOL delay to a priority metric can differ from BS 502 to BS 506. Therefore, the priority metric that may be mapped to BS 502 can be a first value that is higher than the priority metric that is mapped to BS 506 while BS 506 has higher priority traffic.

Nonetheless, BS provisioning interface 513 and BS provisioning interface 519 can receive configuration information from controller provisioning interface 512 that can enable BS 506 and BS 502 to provide similar service for traffic having a similar associated priority metric, QoS, Quality of Service Class Identifier (QCI) parameter and/or traffic type.

In some embodiments, the controller provisioning interface 512 and/or one or more of the BS provisioning interfaces 519, 513, 520, can be configured to perform one or more of the functions for configuration of scheduling policy described herein with reference to the systems, methods, apparatus and/or computer program products. By way of example, but not limitation, the functions for configuration of scheduling policy can include computing and/or determining priority metrics, parametric or tabular priority functions, evaluating QoS and/or QCI parameters, providing slow time scale or fast time scale resource allocation, determining buffer state information, average delay, average arrival rate, average service rate, and/or average queue length associated with traffic at or intended for the BSs 502, 506, 508, scheduling traffic at or intended for BSs 502, 506, 508, mapping one or more parameters related to the traffic at or intended for BSs 502, 506, 508 to a priority metric and/or to a priority function and/or determining a priority metric based on at least a priority function.

The BSs 502, 506, 508 can include processors 521, 515, 522, respectively. The controller 503 can include a processor 514. Processors 521, 515, 522, 514 can be configured to perform one or more of the functions described herein with reference to any of the systems, methods, apparatus and/or computer program products.

The BSs 502, 506, 508 can include memory 523, 517, 524, respectively, and the controller 503 can include a memory 516. The memory 523, 517, 524, 516 can be for storing computer-executable instructions and/or information for performing the functions described herein with reference to any of the systems, methods, apparatus and/or computer program products.

The BSs 502, 506, 508 can include transceivers 511, 530, 518, respectively. The controller 503 can include a transceiver 510. Transceivers 511, 530, 518, 510*d* can be configured to transmit and/or receive configuration information, control information, data and/or any other type of information described herein with reference to any of the systems, methods, apparatus and/or computer program products.

In some embodiments, the controller provisioning interface 512 can transmit to the BSs 502, 506, 508, configuration information for configuring the corresponding BS provisioning interfaces 519, 513, 520. While the following description is provided for BS 502, the description can apply for any one of BSs 502, 506, 508.

A BS 502, for example, that receives the configuration information, can configure the BS provisioning interface 519, to map one or more parameters associated with traffic at the BS 502 to a priority function. The one or more parameters can include, but are not limited to, QoS parameters and/or QCI parameters (when system 500 is an LTE system). The priority function can be a function of acceptable error rates for the traffic, delays for the traffic, traffic packets transmitted or received and/or traffic packet throughput and/or any information indicative of a QoS of traffic including, but not limited to, instantaneous and/or average HOL delay, packet delay, queue length, packet sizes, and/or average rate at which the queue has been served in the past.

The BS provisioning interface 519 can be configured to employ one or more of two different types of priority functions. For example, the BS provisioning interface 519 can be configured to employ a parametric priority function (or a class of parametric priority functions) and/or a tabular priority function. Equation one is an example of a parametric priority function that can be employed by the BS provisioning interface 519 for an LTE system using QCI parameters:

$$w_1 x^\alpha + w_2 \log(x) + w_3 D + w_4 q + w_5 \exp(D/w_6) + w_7 \exp(q/w_8) + w_9 \log(D) + w_{10} \log(q) \quad (1)$$

where x is an average rate of serving the queue, D is an HOL delay, and/or q is a queue length, and, in an LTE system, a and $w_i$ are constants configured as functions of the QCI parameters. One or more of the BSs 502, 506, 508 can employ the parametric priority function to provide similar scheduling of similar traffic. In some embodiments, the parametric function can be employed by all BSs 502, 506, 508 in the system 500. In these embodiments, all BSs 502, 506, 508 each implement the same scheduler.

Equation one is one embodiment of a parametric priority function for mapping parameters associated with a buffer at the BS 502 to a priority metric for the traffic in the buffer. In other embodiments, more general priority functions can be used. By way of example, but not limitation, the priority function can include any number of functions to determine a priority of traffic for the UE. The functions can include, but are not limited to, those that utilize: the instantaneous HOL delay for the queue at the BS 502, delays of various packets in the queue at the BS 502, queue length at the BS 502, packet sizes in the queue at the BS 502, and/or the average rate at which the queue at the BS 502 has been served in the past.

In some embodiments, the priority function can be a generic numerical function. For example, the generic numerical function can be specified as a table of values. By way of example, but not limitation, with reference to equation one, the values can include values for x, q and/or D.

In some embodiments, the mapping to the priority function can vary depending on the QCI parameters. For example, in some embodiments, logical channel (LC) and/or logical channel groups (LCGs) with different QCI parameters could have different mappings to priority metrics.

In some embodiments, the BS provisioning interface 519 can employ strict priority scheduling between classes of traffic transmitted from the BS 502. The BSs 502, 506, 508 can provision the priority function for strict priority scheduling based on configuration information received from controller 503.

By way of example, but not limitation, one or more different parameterizations of the priority function can be used to allow for strict priority in scheduling. For strict priority scheduling, between transmissions of traffic, a threshold for acceptable transmit power level for an interfering BS transmission can be determined. The interfering BS can be required to maintain transmit power levels below the threshold to improve the likelihood of an acceptable signal-to-interference and noise ratio (SINR) in the system 500.

The amount of SINR that is deemed as acceptable can differ for different types of traffic. By way of example, but not limitation, in some embodiments, a relatively high SINR can be designated to be provided for high priority traffic to enable the system 500 to achieve the QoS level associated with the traffic type. One or more of the BSs 502, 506, 508 can employ the strict priority scheduling to provide similar scheduling of similar traffic.

In some embodiments, the BS provisioning interface 519 can employ priority functions that incorporate slow time scale resource allocation to generate priority metrics. In these embodiments, the transmit power level and/or spectrum resources allocated to one or more different cells by the controller 503 can be adapted at a slow time scale. The priority function can depend on the QCI parameters and slow time scale information. In this embodiment, the priority function can depend on QCI parameters and slow time scale information such as average delay, average arrival rate, average service rate, and/or average queue length at the BS 502. The priority function can be parametric or tabular.

In some embodiments, instead of or in addition to a parametric priority function, the BS provisioning interface 519 can be configured to employ a tabular priority function. In some embodiments, the BSs 502, 506, 508 can provision the tabular priority function based on configuration information received from controller 503.

The tabular priority function can be a generic numerical function that can be specified as a table that maps values of x, q and/or D to priority metric values. The mapping can differ, in some embodiments, based on the QCI parameters. Accordingly, different LCs and/or LCGs having different QCI parameters can have different mappings to a priority metric albeit the BS provisioning interface 519 is configured with the same table including the different values composing the tabular priority function. One or more of the BSs 502, 506, 508 can employ the tabular priority function to provide similar scheduling of similar traffic.

In some embodiments, to simplify the processing at the BSs 502, 506, 508, the number of parameters evaluated to map to a priority function can be reduced from that shown in equation one. By way of example, but not limitation, the number of parameters can be reduced to one to three parameters. For example, the parameters can include HOL delay, average rate of the queue and/or the queue length at BS 502, 506, 508. In some embodiments, the parameters can be any QCI and/or QoS parameters that can be evaluated to map to a priority function.

The BSs 502, 506, 508 can numerically provision a three-dimensional priority function that maps the numerical values of the one or more parameters to a priority metric. The BSs 502, 506, 508 can provision the priority function based on configuration information received from controller 503. The priority metric can be a fourth dimension that is based on the values for the parameters.

In some embodiments, the three-dimensional priority function can be tabular and specified as a table of values for the one to three different parameters. For example, the values for the parameters can be represented as quantized points on a grid where the quantized points represent quantized values of values in the table.

Figure 6:
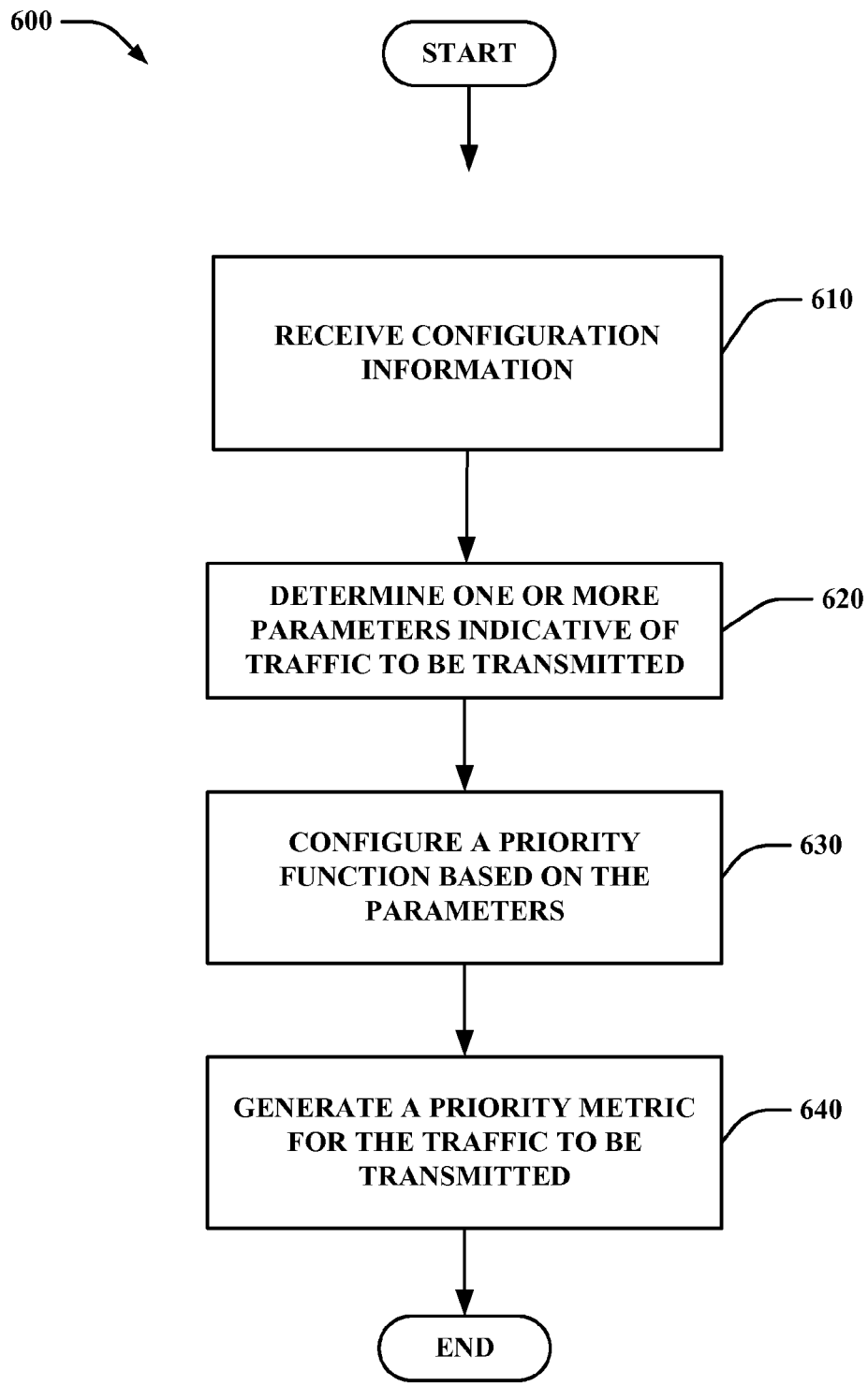
FIG. 6 is an illustration of an example of a flowchart of a method providing configuration of scheduling policy for facilitating distributed scheduling in accordance with various aspects set forth herein.

FIG. 6 is an illustration of an example of a flowchart of a method providing configuration of scheduling policy for facilitating distributed scheduling in accordance with various aspects set forth herein. The method 600 can provide configuration of scheduling policy for facilitating distributed scheduling.

At 610, method 600 can include receiving configuration information to provision a priority function for configuring the scheduling policy for traffic. In some embodiments, the configuration information can be received at a plurality of BSs in a respective plurality of different cells. With reference to FIG. 5, by way of example, but not limitation, the configuration information can be received at one or more of BSs 502, 506, 508. The configuration information can be for configuring the scheduling policy for traffic at each of the BSs 502, 506, 508.

At 620, method 600 can include determining one or more parameters indicative of the traffic to be transmitted from the BSs 502, 506, 508.

At 630, method 600 can include configuring the priority function based on at least one or more parameters indicative of the traffic to be transmitted from BSs 502, 506, 508. In some embodiments, the one or more parameters indicative of the traffic can be QoS parameters. In some embodiments, the QoS parameters are QCI parameters. In these embodiments, the priority function can be a parametric priority function having one or more constants configured as a function of the QCI parameters.

In some embodiments, at least one of the one or more parameters indicative of the traffic can be an average rate of serving a queue at one of the BSs 502, 506, 508, a head of line delay at one of the BSs 502, 506, 508 or a queue length at one of the BSs 502, 506, 508.

In some embodiments, the traffic can be associated with one of one or more logical channels, and the priority function can be configured for the one or more logical channels.

At 640, method 600 can include generating a priority metric for the traffic to be transmitted from the BSs 502, 506, 508 based on at least one or more values of the one or more parameters indicative of the traffic and/or on the priority function.

At 650, method 600 can include determining transmission power levels based on the priority function and/or channel gains of serving links and interfering links of the BSs 502, 506, 508.

In one embodiment, the priority function can be a parametric priority function. One or more different parameterizations of the parametric priority function can allow the BSs 502, 506, 508 to provide strict priority scheduling of the traffic wherein interfering traffic from an interfering BS can be scheduled for transmission if an interference caused by the interfering traffic is below a selected threshold. In some embodiments, the threshold is an SINR. The selected threshold and/or SINR can be a first value if a priority of the traffic is a first priority and a second value if a priority of the traffic is a second priority. The first value can be greater than the second value if the first priority is higher than the second priority.

In some embodiments, the priority function can be a tabular priority function. In these embodiments, generating the priority metric for the traffic based on at least one or more values of the one or more parameters indicative of the traffic at step 640 can include mapping the at least one or more values of the one or more parameters indicative of the traffic to the priority metric.

In various embodiments, the one or more parameters indicative of the traffic can include one or more of: head of line delay at one of the BSs 502, 506, 508, an average rate of a queue at one of the BSs 502, 506, 508, an average channel state on which the traffic can be scheduled to be transmitted, a packet error rate associated with a packet including the traffic, a queue length at one of the BSs 502, 506, 508, an average rate of a queue at one of the BSs 502, 506, 508, a size of a packet including the traffic, a queue length at one of the BSs 502, 506, 508, a channel gain over a serving communication link, a channel gain over a cross communication link or an average rate at which a queue at one of the BSs 502, 506, 508 has been served over a past time interval.

Figure 7:
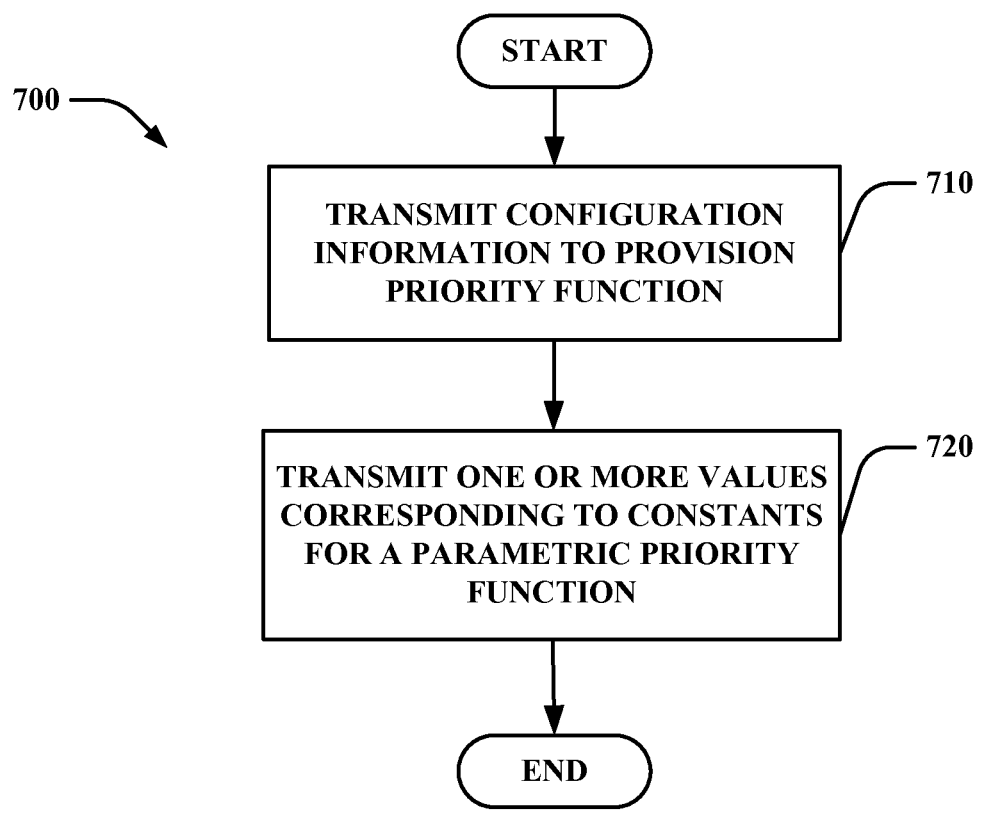
FIG. 7 is an illustration of an example of a flowchart of a method providing configuration of scheduling policy for facilitating distributed scheduling in accordance with various aspects set forth herein.

FIG. 7 is an illustration of an example of a flowchart of a method providing configuration of scheduling policy for facilitating distributed scheduling in accordance with various aspects set forth herein. At 710, method 700 can include transmitting configuration information to provision a priority function for configuring the scheduling policy for traffic. The configuration information can be transmitted to a plurality of BSs in a respective plurality of different cells. The configuration information can be for provisioning the priority function at each of the plurality of BSs. With reference to FIG. 5, in some embodiments, the configuration information can be for provisioning the priority function at the BSs 502, 506, 508.

In some embodiments, the traffic can be associated with one or more LCs. In these embodiments, the priority function can be configured for one or more of the LCs.

In some embodiments, one or more parameters are indicative of the traffic. In these embodiments, the priority function can be based on the parameters indicative of the traffic.

In some embodiments, the priority function can be a parametric priority function having one or more constants. At 720, the method 700 can include transmitting one or more values corresponding to the one or more constants of the parametric priority function. The one or more constants can be employed in the parametric priority function to generate a priority metric according to which the traffic can be scheduled.

In some embodiments, one or more different parameterizations of the parametric priority function can enable the BSs 502, 506, 508 to provide strict priority scheduling of the traffic of different classes. To provide strict scheduling of the traffic, interfering traffic can be scheduled for transmission if an interference caused by the interfering traffic is below a selected threshold.

In some embodiments, the priority function can be a tabular priority function. In these embodiments, the priority metric can be generated based on mapping one or more values of the parameters to the priority metric.

In various embodiments, the parameters can include one or more of: head of line delay at BSs 502, 506, 508, an average rate of a queue at BSs 502, 506, 508, an average channel state on which the traffic can be scheduled to be transmitted, a packet error rate associated with a packet including the traffic, a queue length at BSs 502, 506, 508, an average rate of a queue at BSs 502, 506, 508, a size of a packet including the traffic, a queue length at BSs 502, 506, 508, a channel gain over a serving communication link, a channel gain over a cross communication link or an average rate at which a queue at BSs 502, 506, 508 has been served over a past time interval.

Figure 8:
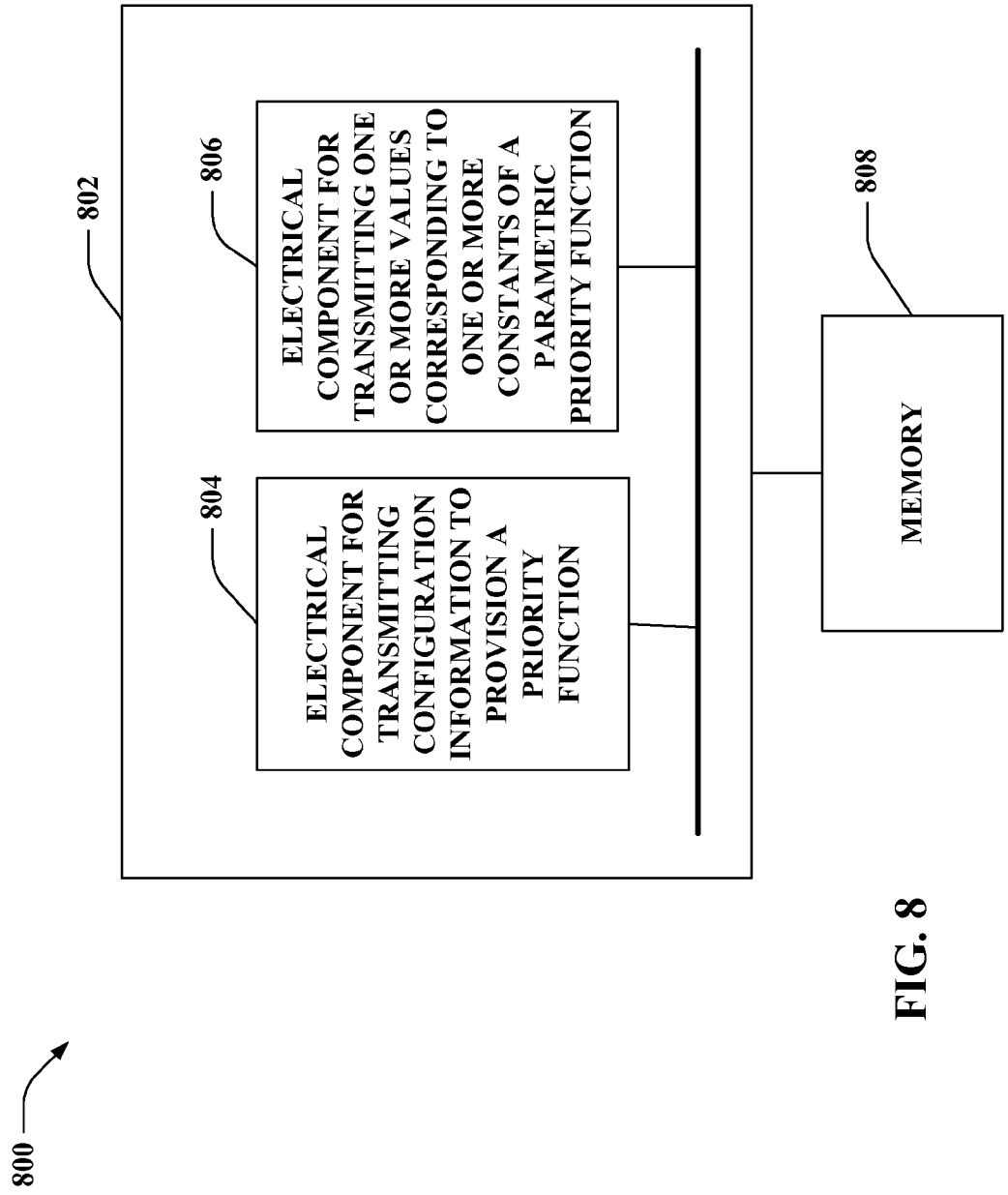
FIGS. 8 and 9 are illustrations of block diagrams of example systems providing configuration of scheduling policy for facilitating distributed scheduling in accordance with various aspects set forth herein.

FIG. 8 is an illustration of a block diagram of an example system of providing configuration of scheduling policy for facilitating distributed scheduling in accordance with various aspects set forth herein. It is to be appreciated that system 800 is represented as including functional blocks, which can be functional blocks that represent functions implemented by a processor, hardware, software, firmware, or combination thereof. System 800 can include a logical or physical grouping 802 of electrical components for configuration of scheduling policy for facilitating distributed scheduling.

The electrical components can act in conjunction. For instance, the logical or physical grouping 802 can include an electrical component 804 for transmitting configuration information to provision a priority function. The traffic can be associated with one of one or more logical channels, and the priority function can be configured for one or more logical channels of traffic. The one or more parameters can be indicative of the traffic, and the priority function for configuring the scheduling policy for traffic can be based on at least the one or more parameters indicative of the traffic.

In embodiments wherein the priority function is a parametric priority function having one or more constants, the logical or physical grouping 802 can also include an electrical component 806 for transmitting one or more values corresponding to the one or more constants. The one or more constants can be employed in the parametric priority function to generate a priority metric according to which the traffic can be scheduled.

In embodiments wherein the priority function is a parametric priority function, one or more different parameterizations of the parametric priority function can enable a BS to provide strict priority scheduling of the different classes of the traffic transmitted from the BS. In some embodiments, strict priority scheduling of the different classes of the traffic can include scheduling interfering traffic can be scheduled for transmission if an interference caused by the interfering traffic is below a selected threshold. In some embodiments, the selected threshold is an SINR value.

In some embodiments, the priority function can be a tabular priority function and a priority metric can be generated based on mapping at least one or more values of the one or more parameters indicative of the traffic to the priority metric.

With reference to FIG. 5, the parameters indicative of the traffic can include one or more of: head of line delay at one or more queues of BSs 502, 506, 508, an average rate of a queue at one or more queues of BSs 502, 506, 508, an average channel state on which the traffic can be scheduled to be transmitted, a packet error rate associated with a packet including the traffic, a queue length at one or more queues of BSs 502, 506, 508, an average rate of a queue at one or more queues of BSs 502, 506, 508, a size of a packet including the traffic, a queue length at one or more queues of BSs 502, 506, 508, a channel gain over a serving communication link, a channel gain over a cross communication link or an average rate at which a queue at one or more queues of BSs 502, 506, 508 has been served over a past time interval.

The logical or physical grouping 802 can also include an electrical component 808 for storing. The electrical component 808 for storing can be configured to store configuration information to provision a priority function and/or one or more constants of a parametric priority function.

Figure 9:
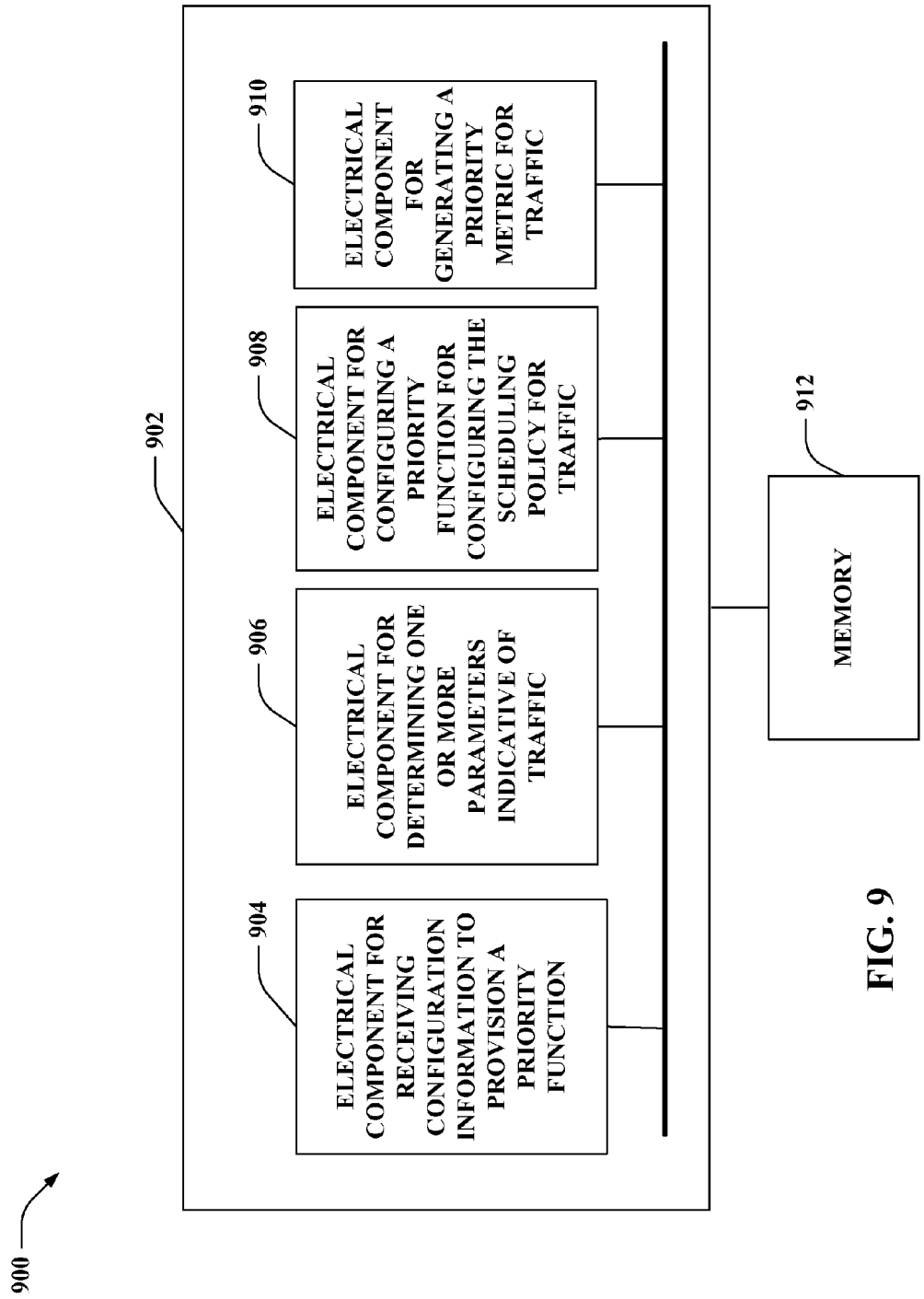

FIG. 9 is an illustration of a block diagram of an example system of providing configuration of scheduling policy for facilitating distributed scheduling in accordance with various aspects set forth herein. It is to be appreciated that system 900 is represented as including functional blocks, which can be functional blocks that represent functions implemented by a processor, hardware, software, firmware, or combination thereof. System 900 can include a logical or physical grouping 902 of electrical components for configuration of scheduling policy for facilitating distributed scheduling.

The electrical components can act in conjunction. For instance, the logical or physical grouping 902 can include an electrical component 904 for receiving configuration information to provision a priority function for configuring the scheduling policy for traffic. The configuration information to provision the priority function can be received at a plurality of BSs in a respective plurality of different cells. The priority function can be for configuring the scheduling policy for traffic at each of the plurality of BSs. With reference to FIG. 5, in some embodiments, the BSs can be BSs 502, 506, 508.

The logical or physical grouping 902 can also include an electrical component 906 for determining one or more parameters indicative of the traffic. The logical or physical grouping 902 can also include an electrical component 908 for configuring the priority function for configuring the scheduling policy for traffic based on at least the one or more parameters indicative of the traffic.

The logical or physical grouping 902 can also include an electrical component 910 for generating a priority metric for the traffic based on one or more values of the parameters indicative of the traffic and the priority function.

The logical or physical grouping 902 can also include an electrical component 912 for determining transmission power levels of different transmissions in a time slot. The transmission power levels that are determined can be based on the priority function and/or channel gains on serving links and on interfering links for the plurality of BSs.

In some embodiments, the traffic can be associated with one of one or more logical channels. The priority function can be configured for the one or more logical channels. In some embodiments, the priority function can be a parametric priority function and one or more different parameterizations of the parametric priority function can enable the BSs 502, 506, 508 to provide strict priority scheduling of the different classes of traffic. In some embodiments, strict scheduling can include scheduling interfering traffic for transmission if an interference caused by the interfering traffic is below a selected threshold. In some embodiments, the selected threshold is an SINR.

In some embodiments, the SINR can be a first value if a priority of the traffic can be a first priority and a second value if a priority of the traffic can be a second priority, wherein the first value can be greater than the second value if the first priority is higher than the second priority.

In some embodiments, the one or more parameters indicative of the traffic can be quality of service parameters. In some embodiments, the quality of service parameters can be quality of service class identifier parameters and the priority function can be a parametric priority function having one or more constants configured as a function of the quality of service class identifier parameters.

In some embodiments, the parameters indicative of the traffic can be an average rate of serving a queue at BSs 502, 506, 508, a head of line delay at BSs 502, 506, 508 or a queue length at BSs 502, 506, 508.

In some embodiments, the priority function can be a tabular priority function. Generating the priority metric can include mapping the values of the parameters to the priority metric.

In some embodiments, the parameters indicative of the traffic can include one or more of: head of line delay at BSs 502, 506, 508, an average rate of a queue at BSs 502, 506, 508, an average channel state on which the traffic can be scheduled to be transmitted, a packet error rate associated with a packet including the traffic, a queue length at BSs 502, 506, 508, an average rate of a queue at BSs 502, 506, 508, a size of a packet including the traffic, a queue length at BSs 502, 506, 508, a channel gain over a serving communication link, a channel gain over a cross communication link or an average rate at which a queue at BSs 502, 506, 508 has been served over a past time interval.

The logical or physical grouping 902 can also include an electrical component 914 for storing. The electrical component 914 for storing information indicative of a priority metric, information for configuring a priority function, configuration information, information for determining parameters indicative of traffic, transmission power levels and/or parameters indicative of traffic.

Further to the descriptions of the apparatus provided with reference to FIG. 5, embodiments of apparatus can be as described below. A first apparatus according to the aspects described herein can include: means for receiving configuration information to provision a priority function for configuring the scheduling policy for traffic. The configuration information can provision a priority function for configuring the scheduling policy for traffic can be received at a plurality of BSs in a respective plurality of different cells. The priority function can be for configuring the scheduling policy for traffic at each of the plurality of BSs.

The apparatus can also include means for determining one or more parameters indicative of the traffic. The apparatus can also include means for configuring the priority function for configuring the scheduling policy for traffic based on at least the one or more parameters indicative of the traffic.

The traffic can be associated with one of one or more logical channels, and the priority function can be configured for the one or more logical channels. The priority function can be a parametric priority function and one or more different parameterizations of the parametric priority function that enable the BS to provide strict priority scheduling of the traffic. The interfering traffic can be scheduled for transmission if an interference caused by the interfering traffic is below a selected threshold. The threshold can be an SINR in some embodiments.

The SINR can be a first value if a priority of the traffic can be a first priority and a second value if a priority of the traffic can be a second priority, wherein the first value can be greater than the second value if the first priority is higher than the second priority.

The parameters indicative of the traffic can be quality of service parameters. The quality of service parameters can be quality of service class identifier parameters. The priority function can be a parametric priority function having one or more constants configured as a function of the quality of service class identifier parameters.

In some embodiments, parameters indicative of the traffic can be an average rate of serving a queue at BSs 502, 506, 508, a head of line delay at BSs 502, 506, 508 or a queue length at BSs 502, 506, 508.

The apparatus can also include means for generating a priority metric for the traffic based on one or more values of the one or more parameters and the priority function for configuring the scheduling policy for traffic.

In some embodiments, the priority function can be a tabular priority function. Generating a priority metric can include mapping one or more values of the one or more parameters to the priority metric.

In some embodiments, the parameters can include one or more of: a head of line delay at BSs 502, 506, 508, an average rate of a queue at BSs 502, 506, 508, an average channel state on which the traffic can be scheduled to be transmitted, a packet error rate associated with a packet including the traffic, a queue length at BSs 502, 506, 508, an average rate of a queue at BSs 502, 506, 508, a size of a packet including the traffic, a queue length at BSs 502, 506, 508, a channel gain over a serving communication link, a channel gain over a cross communication link or an average rate at which a queue at BSs 502, 506, 508 has been served over a past time interval.

In one embodiment, the apparatus includes: a base station provisioning interface configured to receive configuration information to provision a priority function for configuring the scheduling policy for traffic. The configuration information for configuring the scheduling policy for traffic can be received at a plurality of BSs. The configuration information can be for provisioning the priority function. The base station provisioning interface can be further configured to: determine one or more parameters indicative of the traffic; and configure the priority function for configuring the scheduling policy for traffic based on at least the one or more parameters indicative of the traffic.

The traffic can be associated with one of one or more logical channels, and the priority function can be configured for the one or more logical channels. The priority function can be a parametric priority function and one or more different parameterizations of the parametric priority function can enable the BSs 502, 506, 508 to provide strict priority scheduling of the different classes of traffic. Strict priority scheduling can include scheduling interfering traffic for transmission if an interference caused by the interfering traffic is below a selected threshold. The selected threshold can be an SINR in some embodiments.

The SINR can be a first value if a priority of the traffic can be a first priority and a second value if a priority of the traffic can be a second priority, wherein the first value can be greater than the second value if the first priority is higher than the second priority.

The parameters indicative of the traffic can be quality of service parameters. The quality of service parameters can be quality of service class identifier parameters and the priority function can be a parametric priority function having one or more constants configured as a function of the quality of service class identifier parameters.

The parameters indicative of the traffic can be an average rate of serving a queue at BSs 502, 506, 508, a head of line delay at BSs 502, 506, 508 or a queue length at BSs 502, 506, 508.

The base station provisioning interface can be further configured to generate a priority metric for the traffic based on at least one or more values of the one or more parameters indicative of the traffic and the priority function.

In some embodiments, the priority function can be a tabular priority function. Generating the priority metric can include mapping one or more values of the one or more parameters indicative of the traffic to the priority metric.

In some embodiments, the parameters indicative of the traffic can include: head of line delay at BSs 502, 506, 508, an average rate of a queue at BSs 502, 506, 508, an average channel state on which the traffic can be scheduled to be transmitted, a packet error rate associated with a packet including the traffic, a queue length at BSs 502, 506, 508, an average rate of a queue at BSs 502, 506, 508, a size of a packet including the traffic, a queue length at BSs 502, 506, 508, a channel gain over a serving communication link, a channel gain over a cross communication link or an average rate at which a queue at BSs 502, 506, 508 has been served over a past time interval.

In another embodiment, another apparatus can include a means for transmitting configuration information to provision a priority function for configuring the scheduling policy for traffic. The configuration information can be transmitted to a plurality of BSs in a respective plurality of different cells for provisioning the priority function. The priority function can be provisioned at the plurality of BSs. In one embodiment, the priority function can be provisioning at the BSs 502, 506, 508.

In some embodiments, the traffic can be associated with one of one or more logical channels, and the priority function can be configured for the one or more logical channels.

The parameters are indicative of the traffic, and the priority function for configuring the scheduling policy for traffic can be based on one or more parameters indicative of the traffic. The priority function can be a parametric priority function having one or more constants. In these embodiments, the apparatus can also include means for transmitting one or more values corresponding to the one or more constants. The one or more constants can be employed in the parametric priority function to generate a priority metric according to which the traffic can be scheduled.

The priority function can be a parametric priority function and one or more different parameterizations of the parametric priority function can enable the BS to provide strict priority scheduling of the traffic. The strict priority scheduling can include scheduling interfering traffic for transmission if an interference caused by the interfering traffic is below a selected threshold. The selected threshold can be an SINR in some embodiments.

In some embodiments, the priority function can be a tabular priority function and a priority metric can be generated based on mapping one or more values of the one or more parameters indicative of the traffic to the priority metric.

The parameters can include head of line delay at BSs 502, 506, 508, an average rate of a queue at BSs 502, 506, 508, an average channel state on which the traffic can be scheduled to be transmitted, a packet error rate associated with a packet including the traffic, a queue length at BSs 502, 506, 508, an average rate of a queue at BSs 502, 506, 508, a size of a packet including the traffic, a queue length at BSs 502, 506, 508, a channel gain over a serving communication link, a channel gain over a cross communication link or an average rate at which a queue at BSs 502, 506, 508 has been served over a past time interval.

In one embodiment, the apparatus includes: a controller provisioning interface configured to transmit configuration information to provision a priority function for configuring the scheduling policy for traffic. The configuration information can be employed to provision a priority function at BSs 502, 506, 508 in the respective plurality of different cells.

The traffic can be associated with one of one or more logical channels, and the priority function can be configured for the one or more logical channels. The parameters are indicative of the traffic, and the priority function can be based on the parameters indicative of the traffic.

The priority function can be a parametric priority function having one or more constants. The controller provisioning interface can be further configured to transmit one or more values corresponding to the one or more constants. The one or more constants can be employed in the parametric priority function to generate a priority metric according to which the traffic can be scheduled.

In some embodiments, the priority function can be a parametric priority function and one or more different parameterizations of the parametric priority function can enable BSs 502, 506, 508 to provide strict priority scheduling of the traffic. Strict scheduling of the traffic can include scheduling interfering traffic can be scheduled for transmission if an interference caused by the interfering traffic is below a selected threshold. The selected threshold can be an SINR in some embodiments.

The priority function can be a tabular priority function and a priority metric can be generated based on mapping at least one or more values of the one or more parameters to the priority metric.

The parameters indicative of the traffic can include one or more of a head of line delay at BSs 502, 506, 508, an average rate of a queue at BSs 502, 506, 508, an average channel state on which the traffic can be scheduled to be transmitted, a packet error rate associated with a packet including the traffic, a queue length at BSs 502, 506, 508, an average rate of a queue at BSs 502, 506, 508, a size of a packet including the traffic, a queue length at BSs 502, 506, 508, a channel gain over a serving communication link, a channel gain over a cross communication link or an average rate at which a queue at BSs 502, 506, 508 has been served over a past time interval.

In some embodiments, a computer program product is provided. The computer program product can include a computer-readable medium. The computer-readable medium can include a first set of codes for causing a computer to receive configuration information to provision a priority function for configuring the scheduling policy for traffic. The configuration information to provision the priority function can be received at a plurality of BSs in a respective plurality of different cells. With reference to FIG. 5, by way of example, but not limitation, the configuration information can be received at one or more of BSs 502, 506, 508. The configuration information can be for configuring the scheduling policy for traffic at each of the BSs 502, 506, 508.

The computer program product can also include a second set of codes for causing the computer to determine one or more parameters indicative of the traffic. The computer program product can also include a third set of codes for causing the computer to configure the priority function for configuring the scheduling policy for traffic based on at least the one or more parameters indicative of the traffic.

In some embodiments, the one or more parameters indicative of the traffic can be QoS parameters. In some embodiments, the QoS parameters are quality of service class identifier parameters. In these embodiments, the priority function can be a parametric priority function having one or more constants configured as a function of the quality of service class identifier parameters.

In some embodiments, at least one of the one or more parameters indicative of the traffic can be an average rate of serving a queue at one of the BSs 502, 506, 508, a head of line delay at one of the BSs 502, 506, 508 or a queue length at one of the BSs 502, 506, 508.

In some embodiments, the traffic can be associated with one of one or more logical channels, and the priority function can be configured for the one or more logical channels.

In some embodiments, a computer program product is provided. The computer program product can include a computer-readable medium. The computer-readable medium can include a first set of codes for causing a computer to transmit configuration information to provision a priority function. The priority function can be for configuring the scheduling policy for traffic. The configuration information can be transmitted to a plurality of BSs in a respective plurality of different cells for provisioning the priority function at each of the plurality of BSs.

In some embodiments, the traffic can be associated with one of one or more logical channels, and the priority function can be configured for the one or more logical channels.

In some embodiments, one or more parameters can be indicative of the traffic, and the priority function for configuring the scheduling policy for traffic can be based on at least the one or more parameters indicative of the traffic.

The priority function can be a parametric priority function having one or more constants.

The computer program product can also include a second set of codes for causing the computer to transmit one or more values corresponding to the one or more constants. The one or more constants can be employed in the parametric priority function to generate a priority metric according to which the traffic can be scheduled.

The priority function can be a parametric priority function and one or more different parameterizations of the parametric priority function can provides strict priority scheduling of the traffic wherein interfering traffic can be scheduled for transmission if an interference caused by the interfering traffic is below a selected threshold. The selected threshold can be an SINR in some embodiments.

In some embodiments, the priority function can be a tabular priority function and a priority metric can be generated based on at least mapping at least one or more values of the one or more parameters indicative of the traffic to the priority metric.

In some embodiments, the one or more parameters indicative of the traffic can include head of line delay at a one of the plurality of BSs, an average rate of a queue at a one of the plurality of BSs, an average channel state on which the traffic can be scheduled to be transmitted, a packet error rate associated with a packet including the traffic, a queue length at of the plurality of BSs, an average rate of a queue at a one of the plurality of BSs, a size of a packet including the traffic, a queue length at a one of the plurality of BSs, a channel gain over a serving communication link, a channel gain over a cross communication link or an average rate at which a queue at a one of the plurality of BSs has been served over a past time interval.

A wireless multiple-access communication system can simultaneously support communication for multiple wireless access terminals. As mentioned above, each terminal can communicate with one or more BSs via transmissions on the forward and reverse links. The forward link (or downlink) refers to the communication link from the BSs to the terminals, and the reverse link (or uplink) refers to the communication link from the terminals to the BSs. This communication link can be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas can be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system can support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 10:
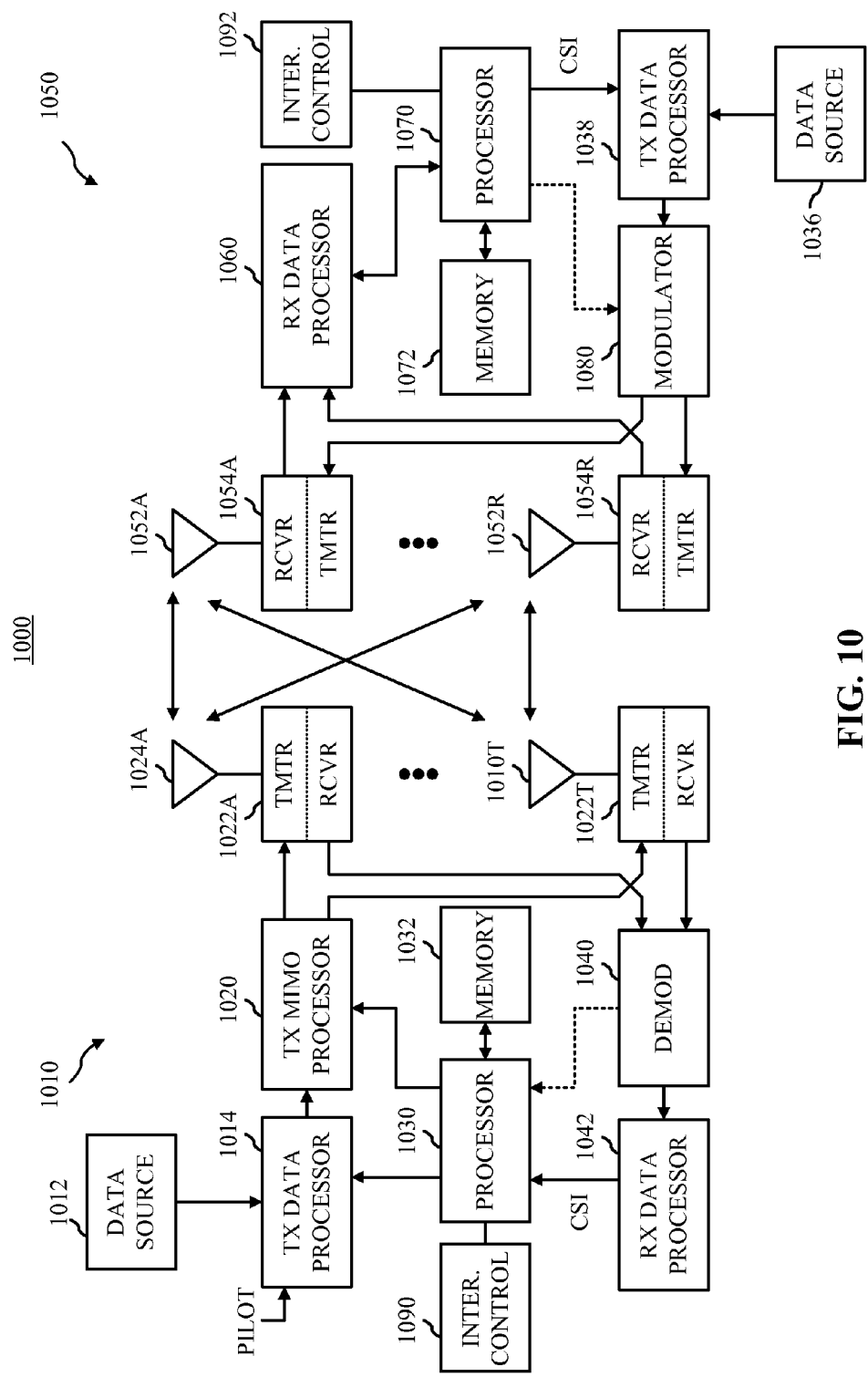
FIG. 10 shows an example wireless communication system in which the embodiments described herein can be employed in accordance with various aspects set forth herein.

FIG. 10 shows an example wireless communication system in which the embodiments described herein can be employed in accordance with various aspects set forth herein. The teachings herein may be incorporated into a node (e.g., a device) employing various components for communicating with at least one other node. FIG. 10 depicts several sample components that may be employed to facilitate communication between nodes. Specifically, FIG. 10 illustrates a wireless device 1010 (e.g., an access point) and a wireless device 1050 (e.g., an access terminal) of a wireless communication system 1000 (e.g., MIMO system). At the device 1010, traffic data for a number of data streams is provided from a data source 1012 to a transmit (TX) data processor 1014.

In some aspects, each data stream is transmitted over a respective transmit antenna. The TX data processor 1014 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1030. A data memory 1032 may store program code, data, and other information used by the processor 1030 or other components of the device 1010.

The modulation symbols for all data streams are then provided to a TX MIMO processor 1020, which may further process the modulation symbols (e.g., for OFDM). The TX MIMO processor 1020 then provides $N_T$ modulation symbol streams to $N_T$ transceivers (XCVR) 1022A through 1022T. In some aspects, the TX MIMO processor 1020 applies beamforming weights to the symbols of the data streams and to the antenna from which the symbol is being transmitted.

Each transceiver 1022 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1022A through 1022T are then transmitted from $N_T$ antennas 1024A through 1024T, respectively.

At the device 1050, the transmitted modulated signals are received by $N_R$ antennas 1052A through 1052R and the received signal from each antenna 1052 is provided to a respective transceiver (XCVR) 1054A through 1054R. Each transceiver 1054 conditions (e.g., filters, amplifies, and downconverts) a respective received signal, digitizes the conditioned signal to provide samples, and further processes the samples to provide a corresponding "received" symbol stream.

A receive (RX) data processor 1060 then receives and processes the $N_R$ received symbol streams from $N_R$ transceivers 1054 based on a particular receiver processing technique to provide $N_T$ "detected" symbol streams. The RX data processor 1060 then demodulates, deinterleaves, and decodes each detected symbol stream to recover the traffic data for the data stream. The processing by the RX data processor 1060 is complementary to that performed by the TX MIMO processor 1020 and the TX data processor 1014 at the device 1010.

A processor 1070 periodically determines which pre-coding matrix to use (discussed below). The processor 1070 formulates a reverse link message comprising a matrix index portion and a rank value portion. A data memory 1072 may store program code, data, and other information used by the processor 1070 or other components of the device 1050.

The reverse link message may comprise various types of information regarding the communication link and/or the received data stream. The reverse link message is then processed by a TX data processor 1038, which also receives traffic data for a number of data streams from a data source 1036, modulated by a modulator 1080, conditioned by the transceivers 1054A through 1054R, and transmitted back to the device 1010.

At the device 1010, the modulated signals from the device 1050 are received by the antennas 1024, conditioned by the transceivers 1022, demodulated by a demodulator (DEMOD) 1040, and processed by a RX data processor 1042 to extract the reverse link message transmitted by the device 1050. The processor 1030 then determines which pre-coding matrix to use for determining the beam-forming weights then processes the extracted message.

FIG. 10 also illustrates that the communication components may include one or more components that perform interference control operations as taught herein. For example, an interference (INTER.) control component 1090 may cooperate with the processor 1030 and/or other components of the device 1010 to send/receive signals to/from another device (e.g., device 1050) as taught herein. Similarly, an interference control component 1092 may cooperate with the processor 1070 and/or other components of the device 1050 to send/receive signals to/from another device (e.g., device 1010). It should be appreciated that for each device 1010 and 1050 the functionality of two or more of the described components may be provided by a single component. For example, a single processing component may provide the functionality of the interference control component 1090 and the processor 1030 and a single processing component may provide the functionality of the interference control component 1092 and the processor 1070.

In an aspect, logical channels can be classified into Control Channels and Traffic Channels. Logical Control Channels can include a Broadcast Control Channel (BCCH), which is a DL channel for broadcasting system control information. Further, Logical Control Channels can include a Paging Control Channel (PCCH), which is a DL channel that transfers paging information. Moreover, the Logical Control Channels can include a Multicast Control Channel (MCCH), which is a Point-to-multipoint DL channel used for transmitting Multimedia Broadcast and Multicast Service (MBMS) scheduling and control information for one or several Multicast Traffic Channels (MTCHs). Generally, after establishing a Radio Resource Control (RRC) connection, this channel is only used by UEs that receive MBMS (e.g., old MCCH+MSCH). Additionally, the Logical Control Channels can include a Dedicated Control Channel (DCCH), which is a Point-to-point bi-directional channel that transmits dedicated control information and can be used by UEs having a RRC connection. In an aspect, the Logical Traffic Channels can comprise a Dedicated Traffic Channel (DTCH), which is a Point-to-point bi-directional channel dedicated to one UE for the transfer of user information. Also, the Logical Traffic Channels can include an MTCH for Point-to-multipoint DL channel for transmitting traffic data.

In an aspect, Transport Channels are classified into DL and UL. DL Transport Channels can include a Broadcast Channel (BCH), a Downlink Shared Data Channel (DL-SDCH) and a Paging Channel (PCH). The PCH can support UE power saving (e.g., Discontinuous Reception (DRX) cycle can be indicated by the network to the UE) by being broadcasted over an entire cell and being mapped to Physical layer (PHY) resources that can be used for other control/traffic channels. The UL Transport Channels can comprise a Random Access Channel (RACH), a Request Channel (REQCH), an Uplink Shared Data Channel (UL-SDCH) and a plurality of PHY channels.

The PHY channels can include a set of DL channels and UL channels. For example, the DL PHY channels can include: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); and/or Load Indicator Channel (LICH). By way of further illustration, the UL PHY Channels can include: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); and/or Broadband Pilot Channel (BPICH).

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors and/or other electronic units designed to perform the functions described herein, or a combination thereof.

When the embodiments are implemented in software, firmware, middleware or microcode, program code or code segments, they can be stored in a machine-readable medium (or a computer-readable medium), such as a storage component.

A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for configuration of scheduling policy to facilitate distributed scheduling, the method comprising:
receiving configuration information to provision a priority function for configuring a scheduling policy for traffic, wherein the configuration information is received at a plurality of base stations in a respective plurality of different cells for provisioning the priority function at each of the plurality of base stations in the respective plurality of different cells, wherein prior to receipt of the configuration information at least some of the plurality of base stations are configured with different priority functions, and wherein the configuration information causes the same priority function to be employed by each of the plurality of base stations, so the plurality of base stations provide similar service for traffic having similar associated traffic parameters, wherein the priority function is a parametric priority function having one or more constants configured as a function of parameters indicative of traffic or a tabular priority function comprising a table that maps values of the parameters indicative of traffic to priority metric values.

2. The method of claim 1, further comprising:
determining the parameters indicative of traffic; and
configuring the priority function for configuring a scheduling policy for traffic based on at least the parameters indicative of traffic.

3. The method of claim 1, wherein the priority function is configured for one or more logical channels, and the traffic is associated with one of the one or more logical channels.

4. The method of claim 1, further comprising determining transmission power levels of different transmissions in a time slot based on the priority function and channel gains on serving links and on interfering links for the plurality of base stations.

5. The method of claim 4, wherein the priority function is the parametric priority function and one or more different parameterizations of the parametric priority function provide strict priority scheduling of the traffic wherein interfering traffic is scheduled for transmission if an interference caused by the interfering traffic is below a selected threshold.

6. The method of claim 5, wherein the selected threshold is a first value if a priority of the traffic is a first priority and a second value if a priority of the traffic is a second priority, wherein the first value is greater than the second value if the first priority is greater than the second priority.

7. The method of claim 2, wherein the parameters indicative of traffic are quality of service parameters.

8. The method of claim 7, wherein the quality of service parameters are quality of service class identifier parameters and the priority function is the parametric priority function having the one or more constants configured as a function of the quality of service class identifier parameters.

9. The method of claim 2, wherein at least one of the parameters indicative of traffic is an average rate of serving a queue at one of the plurality of base stations in a respective plurality of different cells, a head of line delay at one of the plurality of base stations in a respective plurality of different cells or a queue length at one of the plurality of base stations in a respective plurality of different cells.

10. The method of claim 2, further comprising generating a priority metric for the traffic based on at least one or more values of the parameters indicative of traffic and the priority function for configuring a scheduling policy for traffic.

11. The method of claim 10, wherein the priority function is the tabular priority function and wherein the generating a priority metric for the traffic based on at least one or more values of the parameters indicative of traffic comprises mapping the at least one or more values of the parameters indicative of traffic to the priority metric.

12. The method of claim 11, wherein the parameters indicative of traffic comprise head of line delay at one of the plurality of base stations in a respective plurality of different cells, an average rate of a queue at one of the plurality of base stations in a respective plurality of different cells, an average channel state on which the traffic is scheduled to be transmitted, a packet error rate associated with a packet including the traffic, a queue length at one of the plurality of base stations in a respective plurality of different cells, an average rate of a queue at one of the plurality of base stations in a respective plurality of different cells, a size of a packet including the traffic, a queue length at one of the plurality of base stations in a respective plurality of different cells, a channel gain over a serving communication link, a channel gain over a cross communication link or an average rate at which a queue at one of the plurality of base stations in a respective plurality of different cells has been served over a past time interval.

13. A computer program product, comprising:
a non-transitory computer-readable medium, comprising:
a first set of codes for causing a computer to receive configuration information to provision a priority function for configuring a scheduling policy for traffic, wherein the configuration information is received at a plurality of base stations in a respective plurality of different cells for provisioning the priority function at each of the plurality of base stations in the respective plurality of different cells, wherein prior to receipt of the configuration information at least some of the plurality of base stations are configured with different priority functions, and wherein the configuration information causes the same priority function to be employed by each of the plurality of base stations, so the plurality of base stations provide similar service for traffic having similar associated traffic parameters, wherein the priority function is a parametric priority function having one or more constants configured as a function of parameters indicative of traffic or a tabular priority function comprising a table that maps values of the parameters indicative of traffic to priority metric values.

14. The computer program product of claim 13, further comprising:
a second set of codes for causing the computer to determine the parameters indicative of traffic; and
a third set of codes for causing the computer to configure the priority function for configuring a scheduling policy for traffic based on at least the parameters indicative of traffic.

15. The computer program product of claim 13, wherein the priority function is configured for one or more logical channels, and the traffic is associated with one of the one or more logical channels.

16. The computer program product of claim 13, further comprising a fourth set of codes for causing the computer to determine transmission power levels of different transmissions in a time slot based on the priority function and channel gains on serving links and on interfering links for the plurality of base stations.

17. The computer program product of claim 16, wherein the priority function is the parametric priority function and one or more different parameterizations of the parametric priority function provides strict priority scheduling of the traffic wherein interfering traffic is scheduled for transmission if an interference caused by the interfering traffic is below a selected threshold.

18. The computer program product of claim 17, wherein the selected threshold is a first value if a priority of the traffic is a first priority and a second value if a priority of the traffic is a second priority, wherein the first value is greater than the second value if the first priority is greater than the second priority.

19. The computer program product of claim 14, wherein the parameters indicative of traffic are quality of service parameters.

20. The computer program product of claim 19, wherein the quality of service parameters are quality of service class identifier parameters and the priority function for configuring a scheduling policy for traffic is the parametric priority function having one or more constants configured as a function of the quality of service class identifier parameters.

21. The computer program product of claim 14, wherein at least one of the parameters indicative of traffic is an average rate of serving a queue at one of the plurality of base stations in a respective plurality of different cells, a head of line delay at one of the plurality of base stations in a respective plurality of different cells or a queue length at one of the plurality of base stations in a respective plurality of different cells.

22. The computer program product of claim 14, further comprising a fourth set of codes for causing the computer to generate a priority metric for the traffic based on at least one or more values of the parameters indicative of traffic and the priority function for configuring a scheduling policy for traffic.

23. The computer program product of claim 22, wherein the priority function for configuring a scheduling policy for traffic is the tabular priority function and wherein the generating a priority metric for the traffic based on at least one or more values of the parameters indicative of traffic comprises mapping the at least one or more values of the parameters indicative of traffic to the priority metric.

24. The computer program product of claim 23, wherein the parameters indicative of traffic comprises head of line delay at one of the plurality of base stations in a respective plurality of different cells, an average rate of a queue at one of the plurality of base stations in a respective plurality of different cells, an average channel state on which the traffic is scheduled to be transmitted, a packet error rate associated with a packet including the traffic, a queue length at one of the plurality of base stations in a respective plurality of different cells, an average rate of a queue at one of the plurality of base stations in a respective plurality of different cells, a size of a packet including the traffic, a queue length at one of the plurality of base stations in a respective plurality of different cells, a channel gain over a serving communication link, a channel gain over a cross communication link or an average rate at which a queue at one of the plurality of base stations in a respective plurality of different cells has been served over a past time interval.

25. An apparatus, comprising:
means for receiving configuration information to provision a priority function for configuring a scheduling policy for traffic, wherein the configuration information is received at a plurality of base stations in a respective plurality of different cells for provisioning the priority function at each of the plurality of base stations in the respective plurality of different cells, wherein prior to receipt of the configuration information at least some of the plurality of base stations are configured with different priority functions, and wherein the configuration information causes the same priority function to be employed by each of the plurality of base stations, so the plurality of base stations provide similar service for traffic having similar associated traffic parameters, wherein the priority function is a parametric priority function having one or more constants configured as a function of parameters indicative of traffic or a tabular priority function comprising a table that maps values of the parameters indicative of traffic to priority metric values.

26. The apparatus of claim 25, further comprising:
means for determining the parameters indicative of traffic; and
means for configuring the priority function for configuring a scheduling policy for traffic based on at least the parameters indicative of traffic.

27. The apparatus of claim 25, wherein the priority function is configured for one or more logical channels, and the traffic is associated with one of the one or more logical channels.

28. The apparatus of claim 25, further comprising means for determining transmission power levels of different transmissions in a time slot based on the priority function and channel gains on serving links and on interfering links for the plurality of base stations.

29. The apparatus of claim 28, wherein the priority function is the parametric priority function and one or more different parameterizations of the parametric priority function provide strict priority scheduling of the traffic wherein interfering traffic is scheduled for transmission if an interference caused by the interfering traffic is below a selected threshold.

30. The apparatus of claim 29, wherein the selected threshold is a first value if a priority of the traffic is a first priority and a second value if a priority of the traffic is a second priority, wherein the first value is greater than the second value if the first priority is greater than the second priority.

31. The apparatus of claim 26, wherein the parameters indicative of traffic are quality of service parameters.

32. The apparatus of claim 31, wherein the quality of service parameters are quality of service class identifier parameters and the priority function is the parametric priority function having the one or more constants configured as a function of the quality of service class identifier parameters.

33. The apparatus of claim 26, wherein at least one of the parameters indicative of traffic is an average rate of serving a queue at one of the plurality of base stations in a respective plurality of different cells, a head of line delay at one of the plurality of base stations in a respective plurality of different cells or a queue length at one of the plurality of base stations in a respective plurality of different cells.

34. The apparatus of claim 26, further comprising means for generating a priority metric for the traffic based on at least one or more values of the parameters indicative of traffic and the priority function for configuring a scheduling policy for traffic.

35. The apparatus of claim 34, wherein the priority function is the tabular priority function and wherein the generating a priority metric for the traffic based on at least one or more values of the parameters indicative of traffic comprises mapping the at least one or more values of the parameters indicative of traffic to the priority metric.

36. The apparatus of claim 35, wherein the parameters indicative of traffic comprise head of line delay at one of the plurality of base stations in a respective plurality of different cells, an average rate of a queue at one of the plurality of base stations in a respective plurality of different cells, an average channel state on which the traffic is scheduled to be transmitted, a packet error rate associated with a packet including the traffic, a queue length at one of the plurality of base stations in a respective plurality of different cells, an average rate of a queue at one of the plurality of base stations in a respective plurality of different cells, a size of a packet including the traffic, a queue length at one of the plurality of base stations in a respective plurality of different cells, a channel gain over a serving communication link, a channel gain over a cross communication link or an average rate at which a queue at one of the plurality of base stations in a respective plurality of different cells has been served over a past time interval.

37. An apparatus, comprising:
a base station provisioning interface configured to receive configuration information to provision a priority function for configuring a scheduling policy for traffic, wherein the configuration information is received at a plurality of base stations in a respective plurality of different cells for provisioning the priority function at each of the plurality of base stations in the respective plurality of different cells, wherein prior to receipt of the configuration information at least some of the plurality of base stations are configured with different priority functions, and wherein the configuration information causes the same priority function to be employed by each of the plurality of base stations, so the plurality of base stations provide similar service for traffic having similar associated traffic parameters, wherein the priority function is a parametric priority function having one or more constants configured as a function of parameters indicative of traffic or a tabular priority function comprising a table that maps values of the parameters indicative of traffic to priority metric values.

38. The apparatus of claim 37, wherein the base station provisioning interface is further configured to:
determine the parameters indicative of traffic; and
configure the priority function for configuring a scheduling policy for traffic based on at least the parameters indicative of traffic.

39. The apparatus of claim 37, wherein the priority function is configured for one or more logical channels, and the traffic is associated with one of the one or more logical channels.

40. The apparatus of claim 37, wherein the base station provisioning interface is further configured to determine transmission power levels of different transmissions in a time slot based on the priority function and channel gains on serving links and on interfering links for the plurality of base stations.

41. The apparatus of claim 40, wherein the priority function is the parametric priority function and one or more different parameterizations of the parametric priority function provide strict priority scheduling of the traffic wherein interfering traffic is scheduled for transmission if an interference caused by the interfering traffic is below a selected threshold.

42. The apparatus of claim 41, wherein the selected threshold is a first value if a priority of the traffic is a first priority and a second value if a priority of the traffic is a second priority, wherein the first value is greater than the second value if the first priority is greater than the second priority.

43. The apparatus of claim 38, wherein the parameters indicative of traffic are quality of service parameters.

44. The apparatus of claim 43, wherein the quality of service parameters are quality of service class identifier parameters and the priority function is the parametric priority function having the one or more constants configured as a function of the quality of service class identifier parameters.

45. The apparatus of claim 38, wherein at least one of the parameters indicative of traffic is an average rate of serving a queue at one of the plurality of base stations in a respective plurality of different cells, a head of line delay at one of the plurality of base stations in a respective plurality of different cells or a queue length at one of the plurality of base stations in a respective plurality of different cells.

46. The apparatus of claim 38, wherein the base station provisioning interface is further configured to generate a priority metric for the traffic based on at least one or more values of the parameters indicative of traffic and the priority function for configuring a scheduling policy for traffic.

47. The apparatus of claim 46, wherein the priority function is the tabular priority function and wherein the generating a priority metric for the traffic based on at least one or more values of the parameters indicative of traffic comprises mapping the at least one or more values of the parameters indicative of traffic to the priority metric.

48. The apparatus of claim 47, wherein the parameters indicative of traffic comprise head of line delay at one of the plurality of base stations in a respective plurality of different cells, an average rate of a queue at one of the plurality of base stations in a respective plurality of different cells, an average channel state on which the traffic is scheduled to be transmitted, a packet error rate associated with a packet including the traffic, a queue length at one of the plurality of base stations in a respective plurality of different cells, an average rate of a queue at one of the plurality of base stations in a respective plurality of different cells, a size of a packet including the traffic, a queue length at one of the plurality of base stations in a respective plurality of different cells, a channel gain over a serving communication link, a channel gain over a cross communication link or an average rate at which a queue at one of the plurality of base stations in a respective plurality of different cells has been served over a past time interval.

49. A method for configuration of scheduling policy to facilitate distributed scheduling, the method comprising:

transmitting configuration information to provision a priority function for configuring a scheduling policy for traffic, wherein the configuration information is transmitted to a plurality of base stations in a respective plurality of different cells for provisioning the priority function at each of the plurality of base stations in the respective plurality of different cells, wherein prior to transmission of the configuration information at least some of the plurality of base stations are configured with different priority functions, and wherein the configuration information causes the same priority function to be employed by each of the plurality of base stations, so the plurality of base stations provide similar service for traffic having similar associated traffic parameters, wherein the priority function is a parametric priority function having one or more constants configured as a function of parameters indicative of traffic or a tabular priority function comprising a table that maps values of the parameters indicative of traffic to priority metric values.

50. The method of claim 49, wherein the priority function is configured for one or more logical channels, and the traffic is associated with one of the one or more logical channels.

51. The method of claim 49, wherein the priority function for configuring a scheduling policy for traffic is based on at least the parameters indicative of traffic.

52. The method of claim 51, wherein the priority function is the parametric priority function having the one or more constants, the method further comprising transmitting one or more values corresponding to the one or more constants, wherein the one or more constants are employed in the parametric priority function to generate a priority metric according to which the traffic is scheduled.

53. The method of claim 49, wherein the priority function is the parametric priority function and one or more different parameterizations of the parametric priority function provide strict priority scheduling of the traffic wherein interfering traffic is scheduled for transmission if an interference caused by the interfering traffic is below a selected threshold.

54. The method of claim 51, wherein the priority function is the tabular priority function and a priority metric is generated based on at least mapping at least one or more values of the parameters indicative of traffic to the priority metric.

55. The method of claim 51, wherein the parameters indicative of traffic comprise head of line delay at one of the plurality of base stations in a respective plurality of different cells, an average rate of a queue at one of the plurality of base stations in a respective plurality of different cells, an average channel state on which the traffic is scheduled to be transmitted, a packet error rate associated with a packet including the traffic, a queue length at one of the plurality of base stations in a respective plurality of different cells, an average rate of a queue at one of the plurality of base stations in a respective plurality of different cells, a size of a packet including the traffic, a queue length at one of the plurality of base stations in a respective plurality of different cells, a channel gain over a serving communication link, a channel gain over a cross communication link or an average rate at which a queue at one of the plurality of base stations in a respective plurality of different cells has been served over a past time interval.

56. A computer program product, comprising:

a non-transitory computer-readable medium, comprising:

a first set of codes for causing a computer to transmit configuration information to provision a priority function for configuring a scheduling policy for traffic, wherein the configuration information is transmitted to a plurality of base stations in a respective plurality of different cells for provisioning the priority function at each of the plurality of base stations in the respective plurality of different cells, wherein prior to transmission of the configuration information at least some of the plurality of base stations are configured with different priority functions, and wherein the configuration information causes the same priority function to be employed by each of the plurality of base stations, so the plurality of base stations provide similar service for traffic having similar associated traffic parameters, wherein the priority function is a parametric priority function having one or more constants configured as a function of parameters indicative of traffic or a tabular priority function comprising a table that maps values of the parameters indicative of traffic to priority metric values.

57. The computer program product of claim 56, wherein the priority function is configured for one or more logical channels, and the traffic is associated with one of the one or more logical channels.

58. The computer program product of claim 56, wherein the priority function for configuring a scheduling policy for traffic is based on at least the parameters indicative of traffic.

59. The computer program product of claim 56, wherein the priority function is the parametric priority function having the one or more constants, the computer program product further comprising a second set of codes for causing the computer to transmit one or more values corresponding to the one or more constants, wherein the one or more constants are employed in the parametric priority function to generate a priority metric according to which the traffic is scheduled.

60. The computer program product of claim 56, wherein the priority function is the parametric priority function and one or more different parameterizations of the parametric priority function provide strict priority scheduling of the traffic wherein interfering traffic is scheduled for transmission if an interference caused by the interfering traffic is below a selected threshold.

61. The computer program product of claim 58, wherein the priority function is the tabular priority function and a priority metric is generated based on at least mapping at least one or more values of the parameters indicative of traffic to the priority metric.

62. The computer program product of claim 61, wherein the parameters indicative of traffic comprise head of line delay at one of the plurality of base stations in a respective plurality of different cells, an average rate of a queue at one of the plurality of base stations in a respective plurality of different cells, an average channel state on which the traffic is scheduled to be transmitted, a packet error rate associated with a packet including the traffic, a queue length at one of the plurality of base stations in a respective plurality of different cells, an average rate of a queue at one of the plurality of base stations in a respective plurality of different cells, a size of a packet including the traffic, a queue length at one of the plurality of base stations in a respective plurality of different cells, a channel gain over a serving communication link, a channel gain over a cross communication link or an average rate at which a queue at one of the plurality of base stations in a respective plurality of different cells has been served over a past time interval.

63. An apparatus, comprising:

means for transmitting configuration information to provision a priority function for configuring a scheduling policy for traffic, wherein the configuration information is transmitted to a plurality of base stations in a respective plurality of different cells for provisioning the priority function at each of the plurality of base stations in the respective plurality of different cells, wherein prior to transmission of the configuration information at least some of the plurality of base stations are configured with different priority functions, and wherein the configuration information causes the same priority function to be employed by each of the plurality of base stations, so the plurality of base stations provide similar service for traffic having similar associated traffic parameters, wherein the priority function is a parametric priority function having one or more constants configured as a function of parameters indicative of traffic or a tabular priority function comprising a table that maps values of the parameters indicative of traffic to priority metric values.

64. The apparatus of claim 63, wherein the priority function is configured for one or more logical channels, and the traffic is associated with one of the one or more logical channels.

65. The apparatus of claim 63, wherein the priority function for configuring a scheduling policy for traffic is based on at least the parameters indicative of traffic.

66. The apparatus of claim 63, wherein the priority function is the parametric priority function having the one or more constants, the apparatus further comprising means for transmitting one or more values corresponding to the one or more constants, wherein the one or more constants are employed in the parametric priority function to generate a priority metric according to which the traffic is scheduled.

67. The apparatus of claim 63, wherein the priority function is the parametric priority function and one or more different parameterizations of the parametric priority function provide strict priority scheduling of the traffic wherein interfering traffic is scheduled for transmission if an interference caused by the interfering traffic is below a selected threshold.

68. The apparatus of claim 65, wherein the priority function is the tabular priority function and a priority metric is generated based on at least mapping at least one or more values of the parameters indicative of traffic to the priority metric.

69. The apparatus of claim 65, wherein the parameters indicative of traffic comprise head of line delay at one of the plurality of base stations in a respective plurality of different cells, an average rate of a queue at one of the plurality of base stations in a respective plurality of different cells, an average channel state on which the traffic is scheduled to be transmitted, a packet error rate associated with a packet including the traffic, a queue length at one of the plurality of base stations in a respective plurality of different cells, an average rate of a queue at one of the plurality of base stations in a respective plurality of different cells, a size of a packet including the traffic, a queue length at one of the plurality of base stations in a respective plurality of different cells, a channel gain over a serving communication link, a channel gain over a cross communication link or an average rate at which a queue at one of the plurality of base stations in a respective plurality of different cells has been served over a past time interval.

70. An apparatus, comprising:
a controller provisioning interface configured to transmit configuration information to provision a priority function for configuring a scheduling policy for traffic, wherein the configuration information is transmitted to a plurality of base stations in a respective plurality of different cells for provisioning the priority function at each of the plurality of base stations in the respective plurality of different cells, wherein prior to transmission of the configuration information at least some of the plurality of base stations are configured with different priority functions, and wherein the configuration information causes the same priority function to be employed by each of the plurality of base stations, so the plurality of base stations provide similar service for traffic having similar associated traffic parameters, wherein the priority function is a parametric priority function having one or more constants configured as a function of parameters indicative of traffic or a tabular priority function comprising a table that maps values of the parameters indicative of traffic to priority metric values.

71. The apparatus of claim 70, wherein the priority function is configured for one or more logical channels, and the traffic is associated with one of the one or more logical channels.

72. The apparatus of claim 70, wherein the priority function for configuring a scheduling policy for traffic is based on at least the parameters indicative of traffic.

73. The apparatus of claim 70, wherein the priority function is the parametric priority function having the one or more constants, wherein the controller provisioning interface is further configured to transmit one or more values corresponding to the one or more constants, wherein the one or more constants are employed in the parametric priority function to generate a priority metric according to which the traffic is scheduled.

74. The apparatus of claim 70, wherein the priority function is the parametric priority function and one or more different parameterizations of the parametric priority function provide strict priority scheduling of the traffic wherein interfering traffic is scheduled for transmission if an interference caused by the interfering traffic is below a selected threshold.

75. The apparatus of claim 72, wherein the priority function is the tabular priority function and a priority metric is generated based on at least mapping at least one or more values of the parameters indicative of traffic to the priority metric.

76. The apparatus of claim 72, wherein the parameters indicative of traffic comprise head of line delay at one of the plurality of base stations in a respective plurality of different cells, an average rate of a queue at one of the plurality of base stations in a respective plurality of different cells, an average channel state on which the traffic is scheduled to be transmitted, a packet error rate associated with a packet including the traffic, a queue length at one of the plurality of base stations in a respective plurality of different cells, an average rate of a queue at one of the plurality of base stations in a respective plurality of different cells, a size of a packet including the traffic, a queue length at one of the plurality of base stations in a respective plurality of different cells, a channel gain over a serving communication link, a channel gain over a cross communication link or an average rate at which a queue at one of the plurality of base stations in a respective plurality of different cells has been served over a past time interval.

\* \* \* \* \*